United States Patent [19]
Brown et al.

[11] Patent Number: 6,046,817
[45] Date of Patent: Apr. 4, 2000

[54] METHOD AND APPARATUS FOR DYNAMIC BUFFERING OF INPUT/OUTPUT PORTS USED FOR RECEIVING AND TRANSMITTING PRINT DATA AT A PRINTER

[75] Inventors: Rickey Carter Brown, Bardstown; Mark Lane Mayberry, Nicholasville, both of Ky.

[73] Assignee: Lexmark International, Inc., Lexington, Ky.

[21] Appl. No.: 09/012,073

[22] Filed: Jan. 22, 1998

Related U.S. Application Data

[63] Continuation-in-part of application No. 08/854,510, May 12, 1997.
[51] Int. Cl.[7] .................................................. G06K 15/00
[52] U.S. Cl. .......................................... 358/1.16; 358/1.15
[58] Field of Search .................................... 358/1.1, 1.15, 358/1.16, 444; 710/8, 10, 12, 13, 14, 17, 18, 19, 52, 54, 56, 57

[56] References Cited

U.S. PATENT DOCUMENTS

| | | | |
|---|---|---|---|
| 4,158,235 | 6/1979 | Call et al. ............................... | 364/900 |
| 4,298,954 | 11/1981 | Bigelow et al. ........................ | 364/900 |
| 4,315,312 | 2/1982 | Schmidt .................................. | 364/200 |
| 4,378,588 | 3/1983 | Katzman et al. ....................... | 364/200 |
| 4,780,815 | 10/1988 | Shiota ..................................... | 364/200 |

(List continued on next page.)

OTHER PUBLICATIONS

HP Laser Jet 5 and 5M printer User's Manual Using the Printer Control Panel–p. 3–13 and Printer Memory—p. D5, Jun. 1996.

*Primary Examiner*—Arthur G. Evans
*Attorney, Agent, or Firm*—Ronald K. Aust, Esq.; Frederick H. Gribbell, Esq.

[57] ABSTRACT

An improved communications buffer system is provided which dynamically allocates the size and number of buffers to optimally receive and transmit packets of communications data over a communications link, while efficiently using the amount of available memory so as to provide optimal throughput capability with respect to the allocated amount of memory. The printer first determines how much "free" memory is available in its "pool area" and then how best to divide up that pool area into both transmit and receive buffers for a single port. Once the entire pool area has been allocated for these transmit and receive buffers, the communication session can begin between the host computer and the printer for communicating the actual print job data. A second embodiment of an improved communications buffer system is also provided which dynamically allocates the size and number of buffers for each of several different communications ports that are installed on a printer, while efficiently using the allocated memory so as to provide optimal throughput capability. This second communications buffer system is primarily designed to efficiently assign memory space for buffers used by the several communications ports from a predetermined amount of memory space (as a "pool" of memory) that has been allocated for external communications functions by the printer. Upon initialization of the printer, each individual port will only be allocated a fairly small portion of that pool area of RAM to give that port a minimal buffer configuration that is sufficient to begin to receive data as it arrives at that port. When a port becomes active, it then requests more memory from the pool area of RAM. Only "active" ports are dynamically allocated any relatively large amounts of RAM out of the pool area of the printer's RAM that is made available for communications. The maximum amount of the pool area that will be assigned to a port typically will be a different quantity for different types of ports, and preferably is never 100% of the pool area.

22 Claims, 12 Drawing Sheets

U.S. PATENT DOCUMENTS

| | | | |
|---|---|---|---|
| 4,965,748 | 10/1990 | Chang et al. | 364/519 |
| 4,977,519 | 12/1990 | Chang et al. | 364/519 |
| 5,038,277 | 8/1991 | Altman et al. | 364/200 |
| 5,046,039 | 9/1991 | Ugajin et al. | 364/900 |
| 5,125,096 | 6/1992 | Brantley, Jr. et al. | 395/800 |
| 5,130,986 | 7/1992 | Doshi et al. | 370/94.1 |
| 5,179,662 | 1/1993 | Corrigan et al. | 395/250 |
| 5,185,853 | 2/1993 | Cheng et al. | 395/115 |
| 5,197,128 | 3/1993 | Campbell et al. | 395/275 |
| 5,206,932 | 4/1993 | Chang et al. | 395/165 |
| 5,276,781 | 1/1994 | Chang et al. | 375/116 |
| 5,289,470 | 2/1994 | Chang et al. | 370/94.1 |
| 5,301,275 | 4/1994 | Vanbuskirk et al. | 395/250 |
| 5,303,347 | 4/1994 | Gagne et al. | 395/250 |
| 5,313,582 | 5/1994 | Hendel et al. | 395/250 |
| 5,381,528 | 1/1995 | Brunelle | 395/250 |
| 5,382,968 | 1/1995 | Endoh | 346/153.1 |
| 5,412,780 | 5/1995 | Rushton | 395/250 |
| 5,436,732 | 7/1995 | Mikami | 358/444 |
| 5,440,692 | 8/1995 | Janicek | 395/700 |
| 5,442,747 | 8/1995 | Chan et al. | 395/164 |
| 5,490,237 | 2/1996 | Zimmerman et al. | 395/115 |
| 5,557,751 | 9/1996 | Banman et al. | 395/250 |
| 5,566,208 | 10/1996 | Balakrishnan | 375/240 |
| 5,566,315 | 10/1996 | Milillo et al. | 395/440 |
| 5,720,015 | 2/1998 | Martin et al. | 395/115 |
| 5,764,866 | 6/1998 | Maniwa | 305/114 |

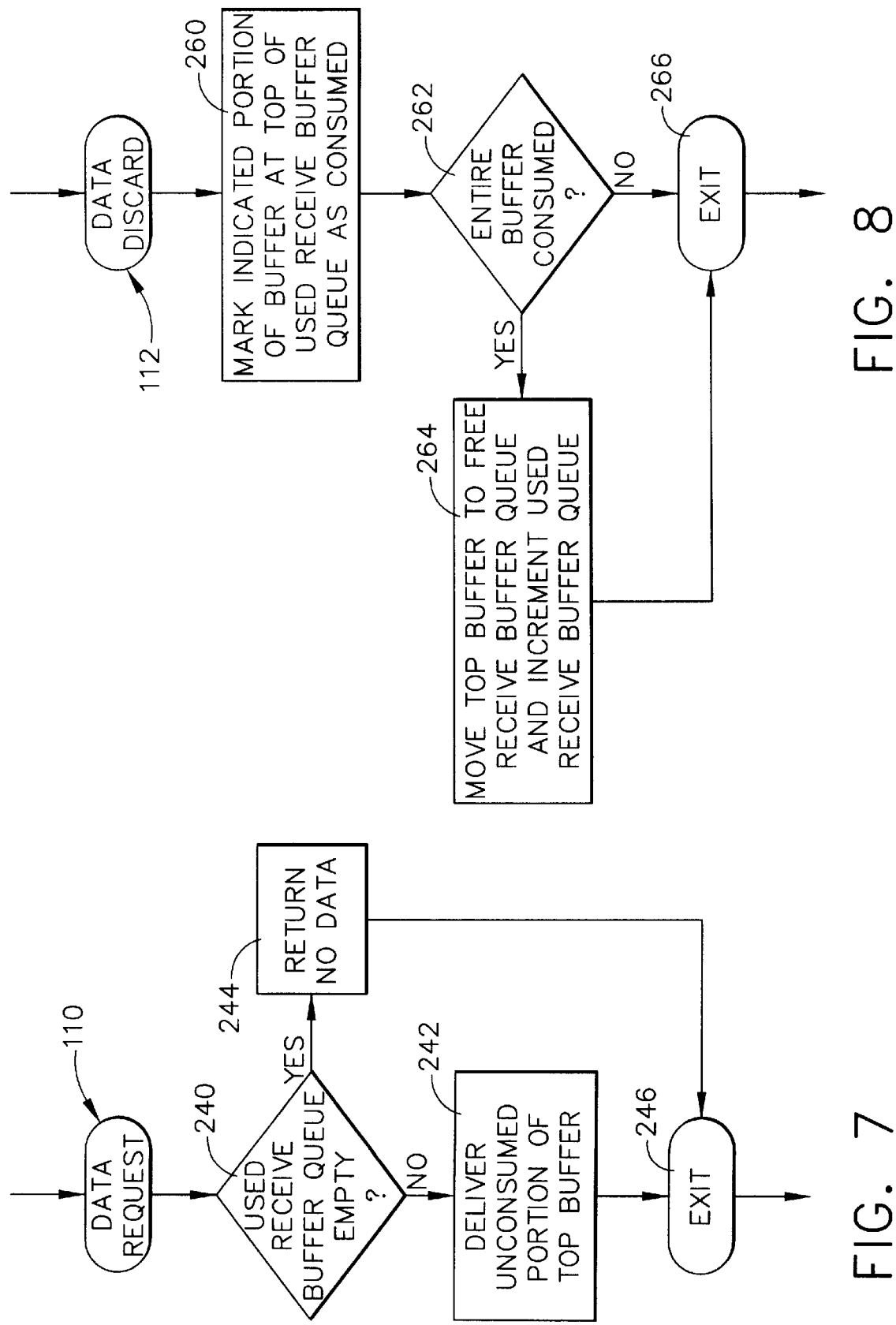

STEP 1:
INITIALIZATION
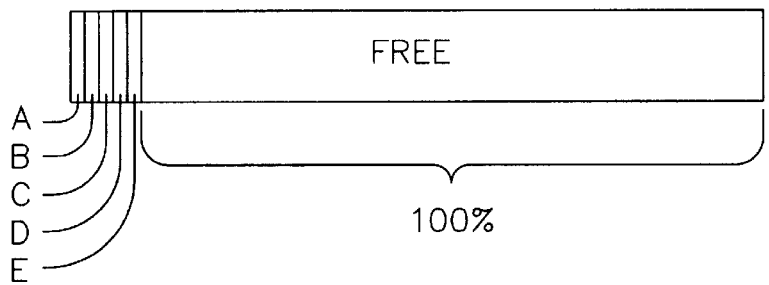
STEP 2:
SIR PORT ACTIVE
(PORT B)
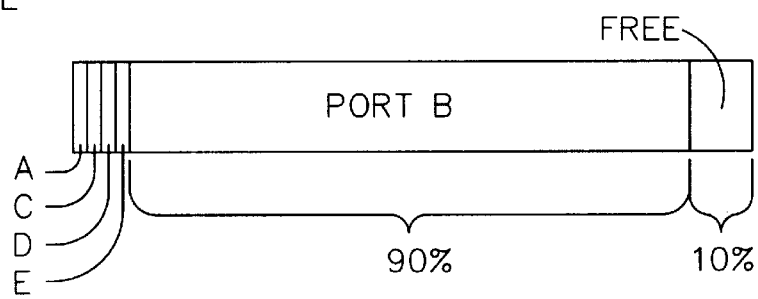
STEP 3:
MIR PORT ACTIVE
(PORT C)
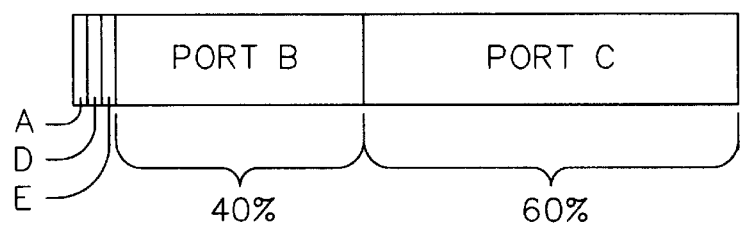
STEP 4:
SERIAL PORT ACTIVE
(PORT D)
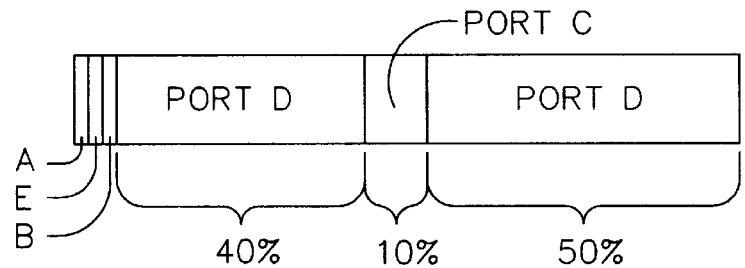
ALTERNATE
STEP 4:
MIR PORT ACTIVE
SERIAL PORT ACTIVE
(PORTS C & D)
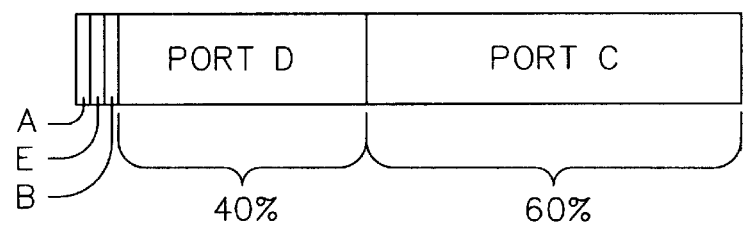
FIG. 13

METHOD AND APPARATUS FOR DYNAMIC BUFFERING OF INPUT/OUTPUT PORTS USED FOR RECEIVING AND TRANSMITTING PRINT DATA AT A PRINTER

This application is a continuation-in-part of application Ser. No. 08/854,510 filed on May 12, 1997.

TECHNICAL FIELD

The present invention relates generally to communications equipment and is particularly directed to a printer of the type which contains multiple communications ports, and lends itself well for use with an infrared port. The invention is specifically disclosed as a printer which dynamically allocates a set of transmit and receive buffers for use in receiving data over a communications link.

BACKGROUND OF THE INVENTION

Communications systems typically use one or more buffers to store data as it is received over a communications link until the receiving unit's processing system is able to digest the information. In most situations, the information coming into the buffer arrives at a data rate that is significantly different than the rate at which the data is consumed. In addition, if the processing system is serial in nature, the processing system is often busy performing some other task when the initial data arrives over the communications link, and therefore, the processor is not immediately available to jump from its other task to the new task of handling the data. Because of this circumstance, some of the conventional buffers can operate in a substantially autonomous mode to store the data in the buffer without any help from the main system processor, so that no data portions are lost before the processor can properly handle this data.

Some of the communications buffer handling systems have been disclosed in United States patents, such as U.S. Pat. No. 5,179,662 (by Corrigan), in which a system is disclosed in which Optimization I/O buffers are used to write data into or read data from auxiliary storage using a double buffer scheme. In this patent, the term auxiliary storage refers to magnetic or optical disks, which are notoriously slow for transferring data to or from their storage media. In the prior art, most computers use buffers to "page" data into and out of auxiliary storage. The buffers are located in a faster memory area, such as RAM. In Corrigan, when the user wants to send data to auxiliary storage, a first buffer is filled with data as the contents are written asynchronously to the auxiliary storage device. Without waiting for the asynchronous write to be completed, a second buffer is filled with data, and after that is filled, its contents are asynchronously written to the auxiliary storage device. If the first buffer has not completed its write operations by this time, then a determination is made that the buffers are too small in size, and the size of both buffers is increased. This increase in size is performed incrementally and continues until the computer does not have to wait synchronously for one buffer to complete its write operation before it can refill that buffer with new data. On the other hand, the buffers could be too large in size, and this is determined to be true when the first buffer completes its write operation before the second buffer is filled beyond a predetermined threshold percentage. If so, the size of both buffers is decreased. Ideally, the first buffer should complete its write operation when the second buffer is filled beyond the predetermined threshold percentage, such as 50%.

Another patent, U.S. Pat. No. 5,289,470 (by Chang), discloses a memory buffer system for storing data packets in a networking device. The networking device has a plurality of buffers, and each buffer set has individual buffers of a certain size. For example, Buffer Set 1 may have 8 buffers, all of the same size. Buffer Set 2 may have 6 buffers, all the same size, however, the buffers in Set 2 are larger than the buffers in Set 1. In the example illustrated in this patent, there are five different sets of buffers, each having a size increasingly larger as the set numeral designation increases. When a data packet is received at the networking device, a buffer is initially allocated from Buffer Set 1. If the packet size does not exceed this allocated buffer size, the entire packet is stored in that buffer. Otherwise, a portion of the data packet fills this first buffer, and another buffer from Set 2 is allocated to store the rest of this packet. If the packet still does not fit within the combined buffers from Set 1 and Set 2, then a buffer from Set 3 is allocated to store this packet. This increasing allocation of larger buffers is continued until the entire data packet is stored in one or more buffers.

Another patent, U.S. Pat. No. 5,303,347 (by Gagne) discloses a network data receiving device that transfers packets of information having different attributes into buffers in a host memory. This memory would be dedicated to particular attribute values or ranges of values, and uses multiple shared data structures in the form of receive rings, each associated with memory buffers dedicated to a particular range of values for a particular packet attribute. An incoming packet is directed to a buffer that has attributes that correspond to attributes of the packet. Some of the attributes that can be used in directing packets into certain types of buffers include (1) packet size, (2) network user identification, (3) a combination of both size and user ID, and (4) other types of attributes such as source ID and data type.

U.S. Pat. No. 5,566,315 (by Milillo) discloses a cache memory space in a computer that is controlled on a dynamic basis by adjusting its low and high thresholds. The low and high thresholds are adjusted based on the number of allocations that are accomplished in response to I/O requests, and on the number of blockages that occur when an allocation cannot be accomplished. The low threshold is set in a direct relationship to a "allocation predictor," and the high threshold is set in a predetermined direct relationship to a "blockage predictor." Cache space is released to increase the amount of free space in cache memory when the amount of free space decreases to the low threshold, and cache space ceases to be released when the amount of free space reaches the high threshold.

U.S. Pat. No. 5,442,747 (by Chan) discloses a multimedia video processor chip having a multi-port central cache memory to queue all incoming data and all outgoing data. Each storage area of the cache is dedicated to storing data from a specific data source. The cache boundaries are chosen that the storage areas are optimized for worst case conditions for data streams in a given mode. No FIFO devices are used to queue the data, and instead, a single central cache is used to queue all data being input or output. The cache is a random access memory (RAM), and its internal boundary areas can be changed when a mode is changed. Three modes disclosed include: (1) where two input streams of interlaced frame data are to be stored in the RAM, with an output data stream that will be non-interlaced image data incorporating the two input streams; (2) a single stream of input data is buffered, and two streams of output data are buffered; and (3) where input data is queued and ultimately captured by a hard disk without being displayed. A boundary control circuit allocates a different group of registers in the buffer such that each group of registers only contains data from a single one of the data sources. The size of each group of registers depends upon the particular mode of operation selected for the video image memory system.

U.S. Pat. No. 5,130,986 (by Doshi) discloses a fiber optic long distance data communication system that requires the receiver to acknowledge to the transmitter for each block of data packets received. Two windows are created: (1) a "network window" that limits the data in the network, having a size set to the value of the bandwidth delay product; and (2) a "receiver flow control window" that temporarily holds the received data to assure that packets are not dropped or lost. The receiver flow control window is set to a value that is greater than or equal to twice the size of the network window.

U.S. Pat. No. 5,440,692 (by Janicek) discloses a D-Base2 buffer pool which can be dynamically expanded or contracted. The expansion requests will be rejected if the virtual storage space remaining would fall below 10 Mbytes. If the expansion request is accepted, it allocates pages of 4K or 32K in size. A contraction request looks first to the type of queue in the buffer. If the type of queue is an "in use" chain, the buffer is not released. If the type of queue is "never used" chain, then it is released. A "previously used" chain is released if the DB2 application is finished with the chain.

U.S. Pat. No. 5,046,039 (by Ugajin) discloses a buffer management system in which the overall buffer size is a constant, but the ratio of the transmitter buffer size to receiver buffer size is variable. When the receiver buffer busy state occurrences per time interval becomes greater than a preset value, the receiver buffer area (or the number of receiver buffers) is increased, and the transmitter buffer area is decreased by the same amount.

U.S. Pat. No. 4,158,235 (by Call) discloses a buffer storage system in which input/output buffers can each be accessed by any of a plurality of I/O ports. Memory cells are assigned by a logical name, which must match the name requested by the data port.

It would be advantageous to provide a printer that is capable of dynamically allocating buffers for its input/output communications ports by deciding both the size and number of such buffers for its ports. It would be even more advantageous for the printer to dynamically allocate buffers for more than one of its input/output communications ports that become active, so as to share a pool of RAM that is provided by the printer's main memory system.

SUMMARY OF THE INVENTION

Accordingly, it is a primary object of the present invention to provide a printer that dynamically allocates buffer size and number of buffers according to the amount of available memory in a "pool area" of the main system memory available for use as buffers, and according to the communications parameters of the port for which these buffers are allocated.

It is another object of the present invention to provide a printer which can communicate with a sending station via an infrared communications port according to the Infrared Data Association Protocol.

It is a further object of the present invention to maximize the utilization of memory in a printer by increasing the size and/or buffers or increasing the number of buffers as required to efficiently store print job data that is being received by the printer, while at the same time allocating the number and size of buffers according to the communications parameters of the particular communications link over which the data is being received.

It is yet a further object of the present invention to provide a printer having an infrared communications port and, during "discovery" with a particular host device, which allocates the size and number of buffers in the printer's memory to most efficiently receive data from that host according to the communications parameters determined during the discovery procedure.

It is yet another object of the present invention to provide a communication device for use with infrared communication links which efficiently uses the amount of available memory for its buffers by allocating the appropriate size and number of buffers for use with a maximum transmit packet size of communication data that can be transmitted by a host station on the other end of the communications link.

It is a yet further object of the present invention to provide a printer that allocates a predetermined "total port memory pool" area of its main RAM memory system for transmit and receive buffers for multiple input/output communications ports residing on the printer, in which each of the multiple communications ports is initially provided with only a minimum configuration of transmit and receive buffers until becoming active, and the printer dynamically allocates buffer size and number of buffers according to the type of communications port that becomes active (e.g., by receiving a print job).

It is a still further object of the present invention to provide a printer that allocates a predetermined "total port memory pool" area of its main RAM memory system for transmit and receive buffers for multiple input/output communications ports residing on the printer, in which each of the multiple communications ports is initially provided with only a minimum configuration of transmit and receive buffers until becoming active, and the printer dynamically allocates buffer size and number of buffers according to an "increment size" that is dependent upon the type of communications port that becomes active.

Additional objects, advantages and other novel features of the invention will be set forth in part in the description that follows and in part will become apparent to those skilled in the art upon examination of the following or may be learned with the practice of the invention.

To achieve the foregoing and other objects, and in accordance with one aspect of the present invention, an improved communications buffer system is provided which dynamically allocates the size and number of buffers to optimally receive packets of communications data over a communications link, while efficiently using the amount of available memory so as to provide optimal throughput capability with respect to the allocated amount of memory. This buffer system is readily adaptable for infrared communications ports, and the dynamic allocation occurs after a "discovery" dialog procedure during which the sending infrared port and receiving infrared port share communications parameters, then both devices switch to a set of agreed-upon communications parameters. After that has occurred, the communications buffer system optimizes the size and number of buffers according to the principles of the present invention. In general, once the sending device disconnects (i.e., ends the communications session), the communications buffer system of the present invention goes back to its default setup.

The communications buffer system of the present invention also lends itself well to being contained in a printing apparatus which receives data, generally in the form of a print job, from one or more host computers and via one or more port on the printer. This type of printer can typically receive data over several different types of ports, including a parallel port, serial port, network port, and an infrared port. The principles of the present invention can be used to dynamically allocate the size and number of buffers for any one of these various types of ports, and as related above, is particularly useful when used with infrared communications ports, since the IrDA (Infrared Data Association) protocol allows the possibility of various transmission rates, data packet sizes, maximum turnaround times, and other communications parameters to vary from one host-receiver combination to another. Until the discovery dialog procedure is performed, the receiving printer apparatus has no realistic way of knowing what the optimum buffer setup should be, since the communications parameters can vary by a large extent.

Once a communications session has begun, and a host computer and printer of the present invention have established a discovery dialog, the printer will obtain sufficient information to most effectively allocate the size and number of buffers. At the beginning of this procedure, the printer must first determine how much "free" memory is available in its "pool area" and then determine how best to divide up that pool area into both transmit and receive buffers. It is important to not only increase the size of these buffers, but very often it is equally important to increase the number of the buffers for various reasons. In particular, if a communications data rate is quite fast for a particular host computer and printer combination, then more than one data packet could be transmitted and received between the host computer and printer during a single transmission session. It is generally very effective to allow the printer to store each packet of information into a single buffer, and therefore, in order to receive a plurality of packets, the printer should make available a like plurality of receive buffers. Of course, each of these receive buffers a would have sufficient memory allocated to the buffer so that it could store an entire maximum packet size for each packet of a particular transmission sequence.

In another aspect of the present invention, at the time of the initial reception of the data message, the size and number of transmit buffers is first determined, and this determination is made after considering how much pool area is available in the printer's memory system at that moment. Once the size and number of transmit buffers has been determined, then the receive buffers are next configured. The first step is to perform a preliminary calculation to ensure that the receive buffer size is not set greater than the amount of data that can be received during the maximum turnaround time for this particular configuration between a host computer and the printer. After this has been determined, the receive buffer size is provisionally set to a power of 2, and the number of buffers is set equal to the remaining pool size divided by this receiver buffer size. After ensuring that there are at least a certain minimum number of receive buffers, then a "window size" is set to a certain maximum size, at least for infrared communications ports. Once the entire pool area has been allocated for these transmit and receive buffers, the communication session can begin between the host computer and the printer for communicating the actual print job data.

A primary advantage of this method of buffer management is in its optimized memory utilization. The memory available for the port is always used in a manner that is most advantageous for the current connection parameters. The fact that these parameters can change while the system is running requires dynamic adjustment. Another advantage of this system is that the data does not need to be copied out of the packet buffer where it was received into a ring awaiting consumption. The data is instead consumed directly out of the packet buffer.

A second embodiment of an improved communications buffer system relating to the present invention is also provided which dynamically allocates the size and number of buffers for each of several different communications ports that are installed on a printer, while efficiently using the allocated memory so as to provide optimal throughput capability. This second communications buffer system is primarily designed to efficiently assign memory space for buffers used by the several communications ports from a predetermined amount of memory space (as a "pool" of memory) that has been allocated for external communications functions by the printer. The input buffer is allocated a certain percentage of the printer's overall RAM, and the printer determines how much of that allocated RAM shall be provided for the buffers used by each of the individual ports. Upon initialization of the printer, each individual port will only be allocated a fairly small portion of that total port memory pool to give that port a minimal buffer configuration that is just sufficient to receive the first packet of print job information as it arrives at that port. When the port becomes active, it then requests more memory from the pool area of RAM.

Each of the printer's communications ports can be of a different type, and yet the memory utilization will be efficient regardless of the variety of types of ports. Only "active" ports are dynamically allocated any relatively large amounts of RAM out of the pool area of the printer's RAM that is made available for communications. Each of the multiple ports are allocated multiple receive buffers and multiple transmit buffers, and each port is provided with four (4) queues that indicate information about the port's respective buffers.

If at least two ports are simultaneously active, then all ports may not be immediately satisfied with the amount of RAM that is initially requested for their buffers from the total port memory pool area in situations where other competing active ports have already received their allocations from the pool area. When that situation occurs, an active port may attempt to "steal" RAM that has been previously allocated to another active port by comparing the priority level of their respective print jobs. If one port is deemed to have priority over another port that already has "extra" RAM (i.e., above its minimum configuration), then bits of RAM are gathered for the higher priority port up to an "increment size" for that port, which is a measurement of a minimum useful size of a buffer (or buffers) that will effectively be usable for this type of port. The maximum amount of the pool area that will be assigned to a port typically will be a different quantity for different types of ports, and preferably is never 100% of the pool area.

Still other objects of the present invention will become apparent to those skilled in this art from the following description and drawings wherein there is described and shown a preferred embodiment of this invention in one of the best modes contemplated for carrying out the invention. As will be realized, the invention is capable of other different embodiments, and its several details are capable of modification in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification illustrate several aspects of the present invention, and together with the description and claims serve to explain the principles of the invention. In the drawings:

FIG. 7 is a flow chart of the "Data Request" function of the Infrared Buffer Manager depicted in FIG. 3.

FIG. 8 is a flow chart of the "Data Discard" function of the Infrared Buffer Manager depicted in FIG. 3.

FIG. 13 a series of memory tables showing memory allocations through several steps of an example, relating to the flow chart of FIG. 11.

DETAILED DESCRIPTION OF THE PREFERRED EMBODIMENT

Reference will now be made in detail to the present preferred embodiment of the invention, an example of which is illustrated in the accompanying drawings, wherein like numerals indicate the same elements throughout the views.

Figure 1:
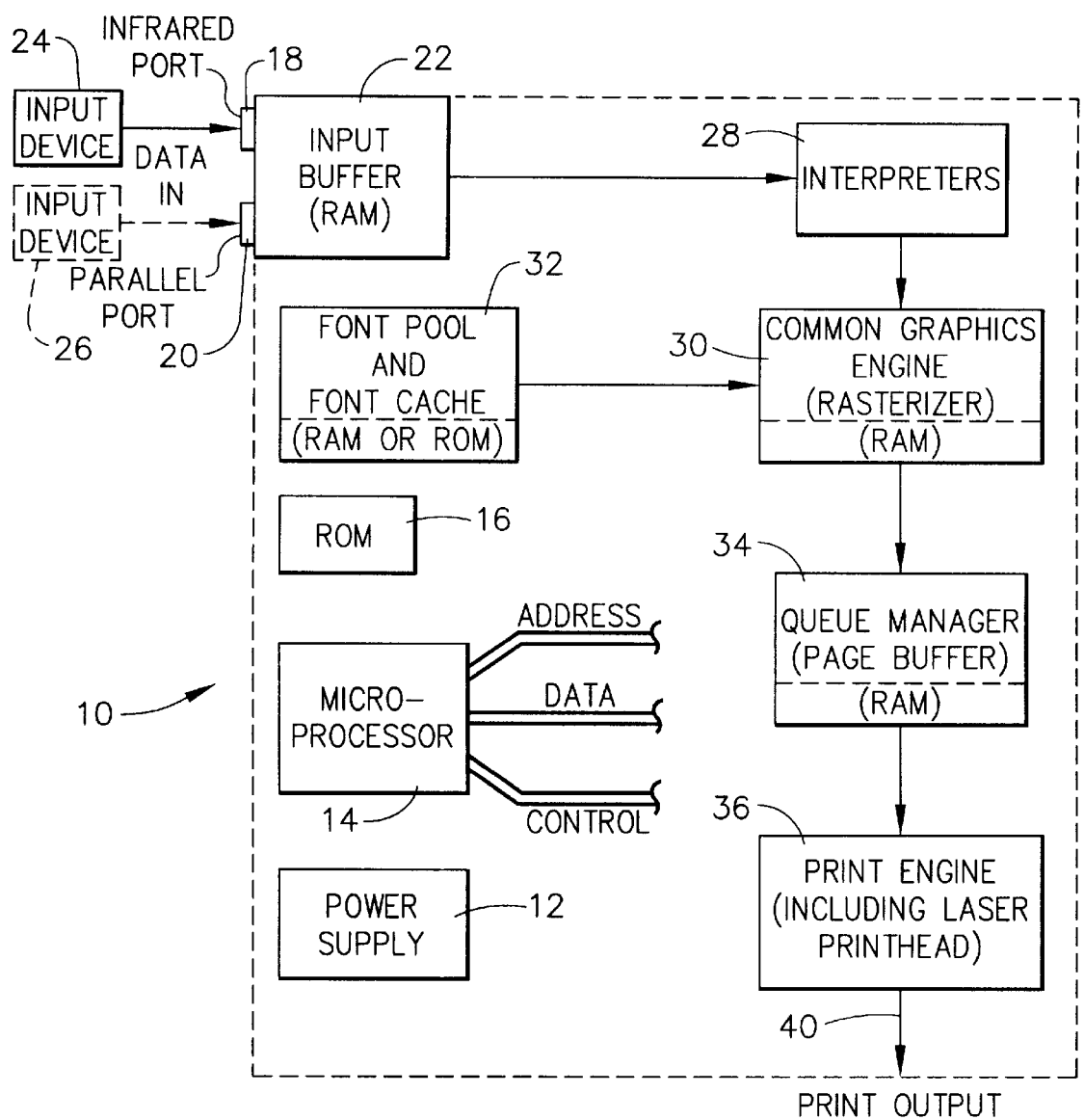
FIG. 1 is a block diagram of the major components of a printer, as constructed according to the principles of the present invention.

Referring now to the drawings, FIG. 1 shows a hardware block diagram of a laser printer generally designated by the reference numeral 10. Laser printer 10 will preferably contain certain relatively standard components, such as a DC power supply 12 which may have multiple outputs of different voltage levels, a microprocessor 14 having address lines, data lines, and control and/or interrupt lines, Read Only Memory (ROM) 16, and Random Access Memory (RAM), which is divided into several portions for performing several different functions.

Laser printer 10 also contains at least one infrared input or parallel input port, or in many cases both types of input ports, as designated by the reference numeral 18 for the infrared port and the reference numeral 20 for the parallel port. Each of these ports 18 and 20 would be connected to a corresponding input buffer, generally designated by the reference numeral 22 on FIG. 1. Infrared port 18 would typically be in communication with an infrared output port of a personal computer or a workstation that would contain a software program such as a word processor or a graphics package or computer aided drawing package. Similarly, parallel port 20 could be connected to a parallel output port of the same type of personal computer or workstation containing the same type of programs. Such input devices are designated, respectively, by the reference numerals 24 and 26 on FIG. 1.

Once the text or graphical data has been received by input buffer 22, it is commonly communicated to one or more interpreters designated by the reference numeral 28. A common interpreter is PostScript™, which is an industry standard used by most laser printers. After being interpreted, the input data is sent typically to a common graphics engine to be rasterized, which typically occurs in a portion of RAM designated by the reference numeral 30 on FIG. 1. To speed up the process of rasterization, a font pool and possibly also a font cache is stored, respectively, in ROM or RAM within most laser printers, and these font memories are designated by the reference numeral 32 on FIG. 1. Such font pools and caches supply bitmap patterns for common alphanumeric characters so that the common graphics engine 30 can easily translate each such character into a bitmap using a minimal elapsed time.

Once the data has been rasterized, it is directed into a queue manager or page buffer, which is a portion of RAM designated by the reference numeral 34. In a typical laser printer, an entire page of rasterized data is stored in the queue manager during the time interval that it takes to physically print the hard copy for that page. The data within the queue manager 34 is communicated in real time to a print engine designated by the reference numeral 36. Print engine 36 includes a laser light source within the printhead, and its output 40 is the physical inking onto a piece of paper, which is the final print output from laser printer 10.

It will be understood that the address, data, and control lines are typically grouped in buses, which are electrically conductive pathways that are physically communicated in parallel (sometimes also multiplexed) around the various electronic components within laser printer 10. For example, the address and data buses are typically sent to all ROM and RAM integrated circuits, and the control lines or interrupt lines are typically directed to all input or output integrated circuits that act as buffers.

The buffer management scheme of the present invention works well for any packet oriented link protocol such as Ethernet, Token Ring or Local Talk. The infrared protocol, because of its dynamic nature, is currently the only one that makes use of all the features. Infrared ports communicate by having a sending station flash a light that is detected by a receiver. Due to the nature of the detector, if a station is transmitting data, its detector is blinded by its own transmission, and is thus unable to receive. This combined with the fact that two stations transmitting at the same time will irreparably garble the transmission, thereby making it imperative that only one station own the link at one time. This much is a common restriction among most network protocols.

The frequency of the light flashes at the sending station determine the data transfer rate over the link. Not all infrared devices are capable of transmitting and receiving data at the same speeds. Currently the data transfer rates range from 2,400 bits per second to 4 million bits per second. In order for optimal communications to occur stations must determine each others' capabilities. This is done through the procedure called "discovery." All infrared (IR) capable stations, if they are not actively engaged in a conversation, are placed into a state called "normal disconnect mode" (NDM).

IR stations are divided into two classes: "primaries" and "secondaries." Actually, these labels refer to the role a station is playing rather than acting as a permanent identification. When an IR station wants to initiate a dialog it assumes the role of a primary and starts a discovery process. Through a standardized process the primary determines the existence of all IR stations within its range. The data transfer parameters of the NDM state are well defined, and all stations in NDM are listening for traffic adhering to these parameters. However, NDM traffic is conducted at a slow data transfer rate (i.e., 9,600 bits per second), so the primary will want to switch to a faster data transfer rate if at all possible.

The primary will identify the station with which it wants to communicate and send a "set normal response mode" (SNRM) command to that station. This command is still sent in the NDM state, and indicates to the secondary that the primary wants to initiate a connection, and also indicates all the capabilities of the primary. The secondary will then compare the primary's capabilities to its own and determine the best set of communication parameters that both stations can support. It sends this information (still in the NDM state) back to the primary. At this point both stations switch to the new communication parameters and begin the connection. Some of the important communication parameters include data transfer rate, maximum turnaround time, minimum turnaround time, maximum packet size, and number of additional beginning-of-frames. All of these attributes are important because they affect the amount of data that can be sent and/or received in a single packet.

It is precisely the ability of the infrared protocol to dynamically adjust packet sizes that creates memory management problems. The problem is further compounded by the fact that (based on transmission speed) there are three different encoding schemes. Most network protocols (including IR) have certain reserved bit patterns to indicate special conditions (such as the beginning and end of packets, etc.). If these bit patterns happen to occur in the data, then they must be "quoted" in some manner to prevent misinterpretation. Two of the encoding schemes get around this problem using "bit stuffing." This essentially requires that there be hardware present to perform this operation, and thus does not affect buffer sizes. However, the third encoding scheme (for the slower data transmission speeds) is usually implemented in software and is done by "byte stuffing." This opens up the possibility that each data byte in a packet could take up to two bytes of buffer space, which must also be taken into account when adjusting buffer sizes.

One straightforward conventional approach in allocating buffers would be to take is the amount of memory reserved for the IR link and divide it into a reasonable number of buffers, an input ring and an output ring. Then as data comes in, move it from the buffer to the input ring, and as data is generated to go out, move it from the output ring into a buffer for transmission. The disadvantage in such a scheme, however, is that the buffers would always have to be set to the maximum supported data packet size. Since the data packet size is negotiated dynamically and could potentially change from job to job, this arrangement results in potentially significant amounts of wasted buffer space. Furthermore, this allows no flexibility with respect to minimum memory requirements; the system must always assume the worst case and allocate space for the largest data packet size supported, regardless of whether this will actually be need or not (and which cannot be determined in advance).

On the other hand, an approach that constantly adjusts the buffers to the (dynamically negotiated) size of the packets will result in optimized memory utilization, and thus a greater port throughput. In the memory management scheme of the present invention, it is preferred to divide the memory only into packet buffers. In order to improve memory utilization the packet buffers are divided into input buffers and output buffers. This is done to optimize the system for different hardware enhancements (e.g., if data is "dequoted" in hardware, but must be quoted by software) as well as to optimize the system based on the station's purpose (e.g., a printer may want several large input buffers, but only a few small output buffers).

Upon initialization, the memory pool allocated to the IR link is divided between input and output buffers based on heuristics determined by the factors related above, as well as assuming the NDM set of communication parameters. Once a new set of communication parameters is received through a SNRM command, all unused buffers are invalidated, their memory is combined together, and a new set of buffers is created based on the same heuristics as before (however, now using the new communication parameters).

In the present invention, each of the above communication parameters may affect the decision as to how large to make each packet buffer. As used herein, the term "maximum turnaround time" refers to the total amount of time that a station may hold onto the communications channel before having to turn it around and allow the other station a chance to use it. Thus it serves no purpose to have either transmit or receive buffers that are larger than the amount of data that can be transmitted (based on the data transfer rate) within this time period. The "minimum turnaround time" refers to the amount of time that the link must remain idle after the sending station and receiving station switch roles. This time is used to allow a station's receiver to recover from the saturation caused by its own transmitter, and varies from device to device. This attribute further reduces the amount of time available for a station to send data. The "maximum packet size" is a parameter by which a station can indicate the largest packet buffer it can handle. Thus it serves no purpose to have a transmit buffer larger than this value. The number of "beginning-of-frames" (BOF's) is a parameter by which a station can request that all packets sent to it contain more than the default number of BOF's. Increasing this value further reduces the time available to send data, and thus affects buffer sizes.

Primary and secondary stations must negotiate and agree upon a common data transfer rate and maximum turnaround time during the "discovery" procedure. However, the other parameters are unique to each station. The maximum transmit packet buffer size for the secondary can be described as the minimum of either:

(1) {(maximum turnaround time−minimum turnaround time of primary) * (transmission speed in bytes per millisecond)−number of BOF's of primary}

OR (2) (maximum packet size of primary).

Similarly, the largest useful receive buffer size for the secondary is:

(1) {(maximum turnaround time−minimum turnaround time of secondary) * (transmission speed in bytes per millisecond)−number of BOF's of secondary}

OR (2) (maximum packet size of secondary).

These sizes may need to be adjusted based on hardware assist (or lack thereof) as well as optimizing for the main function of the device. Each time new data packet sizes are negotiated (potentially, each time a primary negotiates with the secondary), then the buffer sizes are recalculated and the unused memory space is reclaimed and divided into transmit and receive buffers as is appropriate for the device. As data is received into the packet buffer, it remains there and is queued in order with other packets that contain input data. This data is then revealed to the "consumer" on a packet-by-packet basis. The address of the data contained in the first packet along with the number of data bytes in that packet are the only things revealed to the consumer until all data in that packet is consumed. At this point the packet is freed and made available to receive more data, and the data in the next packet in the queue is revealed to the consumer.

Figure 2:
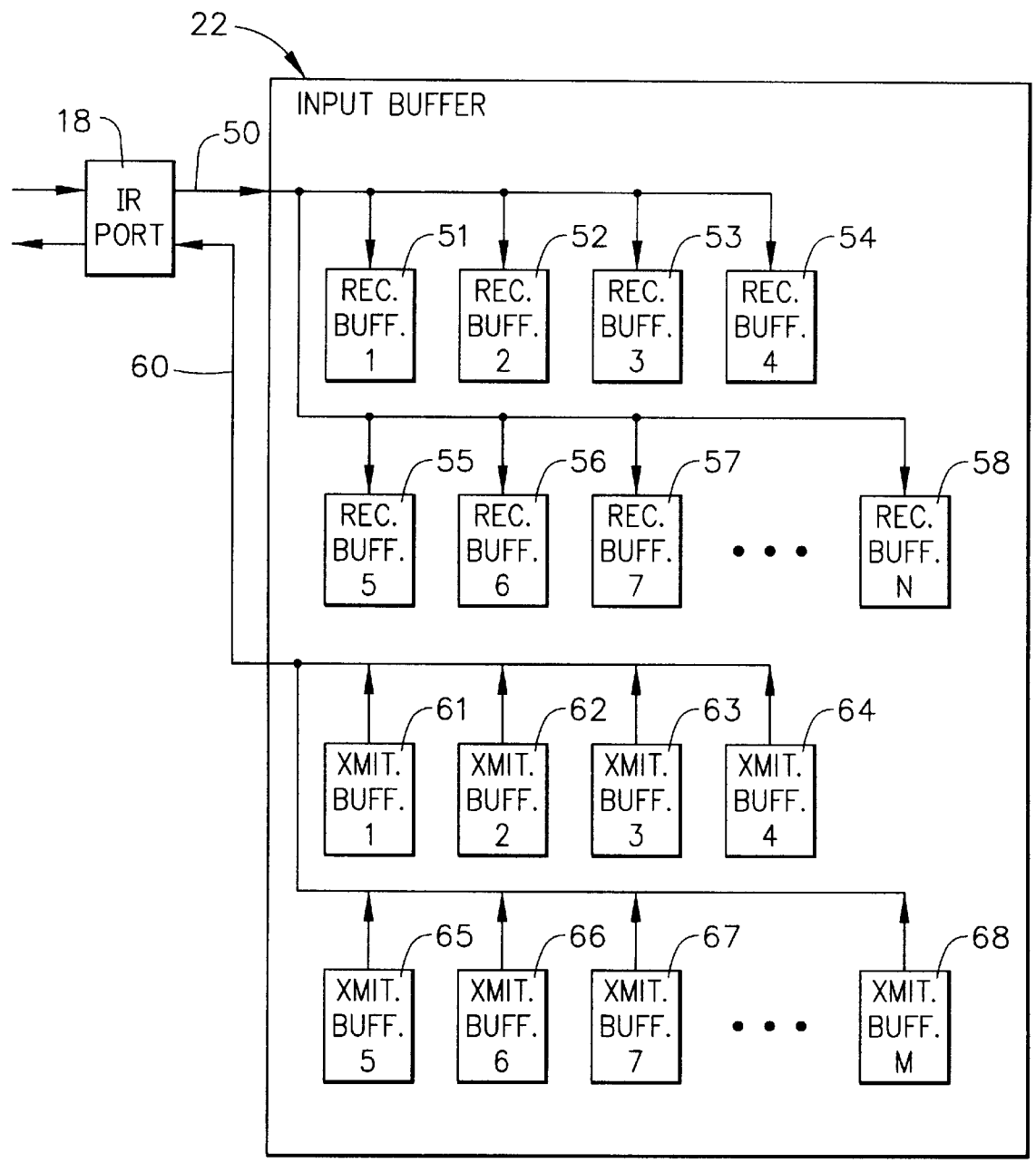
FIG. 2 is a diagrammatic view of portions of the input buffer of the printer depicted in FIG. 1.

In FIG. 2, the IR port 18 is depicted as being in communication with the input buffer 22. There are two communication directions, an input direction depicted by the reference numeral 50, and an output direction depicted by the reference numeral 60. As IR port 18 receives data packets from a host computer or other type of transmitting station, each packet is delivered, one-by-one, into one of the receive buffers depicted by the reference numerals 51–58. For example, if the transmitting (or "primary") station 24 and IR port 18 are both capable of communicating at a relatively fast data rate, then several data packets may be potentially transmitted and received within a single maximum turnaround time interval. According to the IrDA standard, there can be a maximum of seven packets transmitted within one turnaround time, and therefore, when using infrared ports on a fast communication link it would be useful to allocate seven receive buffers in input buffer 22 to receive these seven data packets, but fewer packets would be acceptable. As depicted on FIG. 2, Receive Buffer #1 is indicated at reference numeral 51, Receive Buffer #2 at reference numeral 52, and so on through Receive Buffer #7 at reference numeral 57.

It may be desirable to allocate more than seven overall receive buffers even where the maximum "window" size of packets per maximum turnaround time is limited to seven, because there may be situations where the printer's processing system cannot access the data in receive buffers 51–57 before the next transmission of data packets is received by the input buffer 22. Therefore, many more receive buffers may be desirable, and FIG. 2 depicts a maximum number of receive buffers for a particular configuration to be sized up to a "receive buffer N" at reference numeral 58.

FIG. 2 also depicts multiple transmit buffers at reference numerals 61–68. For a printing device, the desired size of each transmit buffer would likely be much smaller than the desired size of each receive buffer, since it is far more likely that a printer will receive large amounts of data than for a printer to be transmitting any large amounts of data. However, normally it is desirable to have several different transmit buffers available in the input buffer 22, so that the printer 10 may send multiple short messages out its IR port 18, and so the printer can also find a convenient place to temporarily store those messages to be transmitted, one per individual transmit buffer, until the communications link is actually available to send those data packets.

It will be understood that the maximum number of packets or sequences that can be transmitted in a single turnaround time period for other types of communications links may be a number much greater than seven, and consequently, input buffer 22 could be configured so that many more than seven receive buffers are allocated to handle such a communications port, without departing from the principles of the present invention. Similarly, for various other types of communications ports, the number of transmit buffers allocated may also be a much greater number than depicted on FIG. 2 without departing from the principles of the present invention. It will further be understood that the number and size of transmit and receive buffers can be allocated dynamically based upon various communications parameters and upon the maximum size of available memory in a common "pool area" of memory presently available for use as buffers for types of ports other than IR ports, while using the principles of the present invention.

Figure 3:
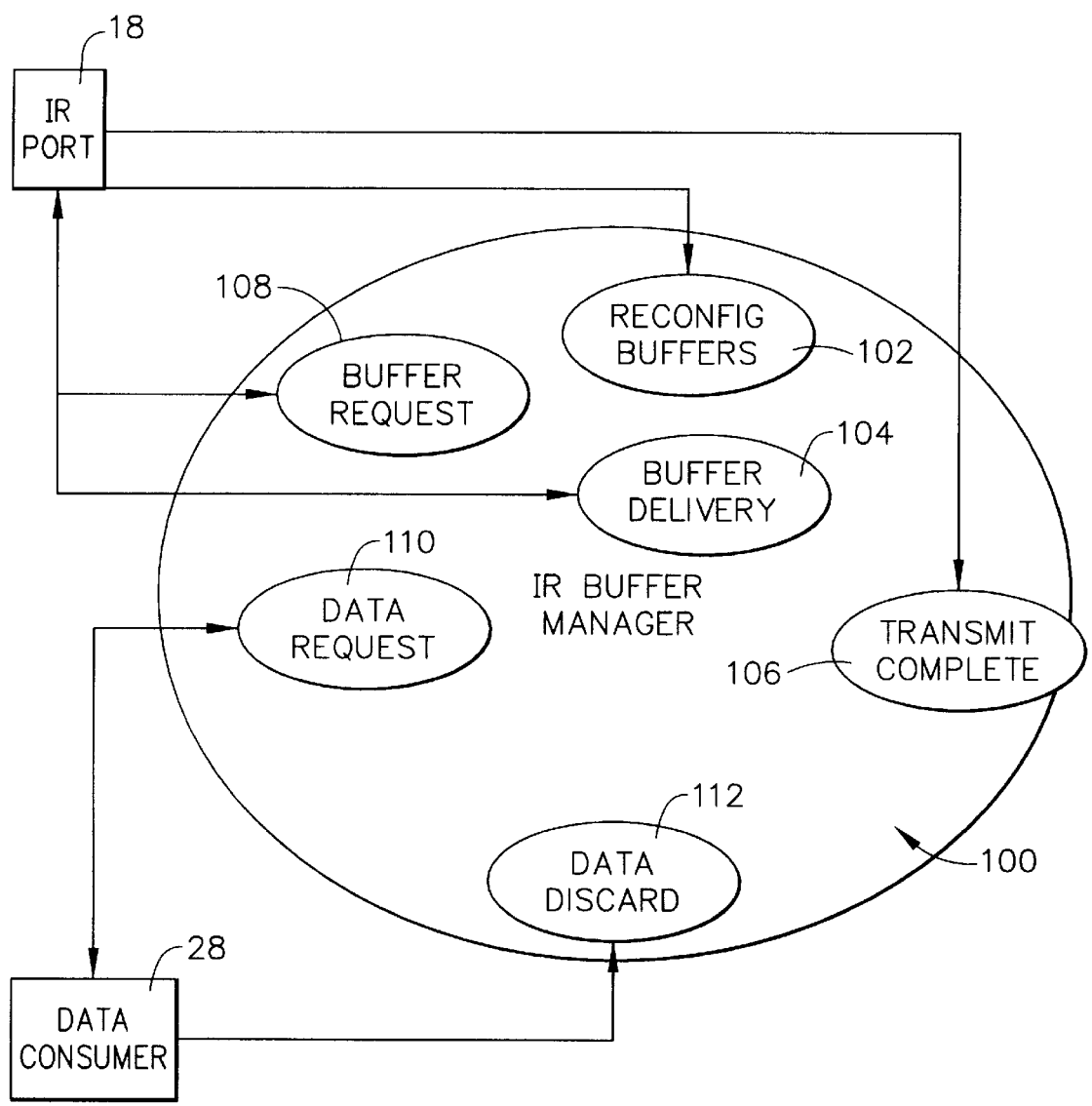
FIG. 3 is a diagrammatic view of the higher-level functions that are performed by an Infrared Buffer Manager for use with the infrared port of the printer depicted in FIG. 1.

FIG. 3 diagrammatically depicts the tasks of an IR Buffer Manager, generally depicted by the reference numeral 100. At the beginning of each dialog with a host computer, including the instance where the host computer is now attempting to send a print job to printer 10, IR port 18 will receive an initial communications message at the standard 9600 baud transmission data rate to determine the optimal data communications parameters that are commonly available to both the host computer (i.e., sending station) 24 and the printer (i.e., receiving station) 10, during the procedure called "discovery." During this discovery procedure, both devices agree upon the communications parameters to be used during the following data transmission, and in particular this includes the data communications rate. At the end of the discovery procedure, both devices (i.e., the transmitting station 24 and the receiving printer 10) then switch to the agreed-upon communications parameters. Once the devices have switched to the new communications parameters, the IR buffer manager will optimize its buffers by a procedure to reconfigure the buffers, as depicted at reference numeral 102. This is a fairly involved procedure, and will be described in greater detail hereinbelow.

After the buffers have been reconfigured, the transmitting station can now send its data in the form of a print job, or other type of communication message. As the data comes in to IR port 18, a buffer is requested at a function 108, and a Buffer Delivery procedure is initiated at a function 104. The Buffer Delivery procedure 104 is described in greater detail hereinbelow. The Buffer Request function 108 is used to supply a buffer for incoming data. Once the buffers are reconfigured (using function 102), all of the buffers are empty (or "free") and the Buffer Request function 108 takes the "top" buffer from the free buffer list and delivers that buffer.

Other functions of the IR manager depicted on FIG. 3 are a Transmit Complete function 106, a Data Request function 110, and a Data Discard function 112. These functions are also described in greater detail hereinbelow. The Data Consumer 28 on FIG. 3 generally represents one or more interpreters that are found on a printer. Of course, if the communications system described herein were to be used on a non-printing apparatus, then the data consumer could be a different apparatus such as a non-volatile memory storage device or some type of monitor or display.

Figure 4A:
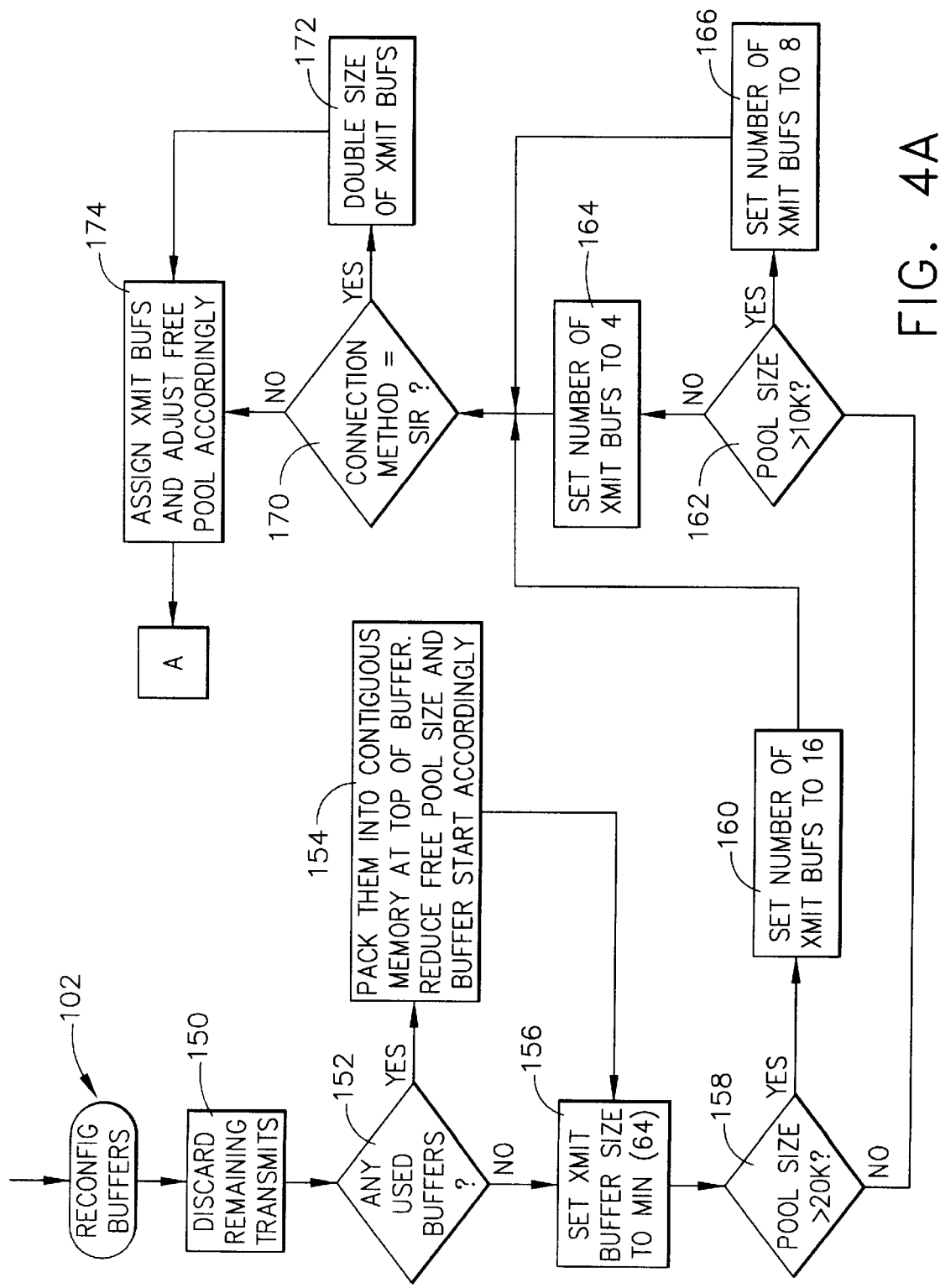
FIGS. 4A and 4B are a flow chart of the "Reconfigure Buffers" function of the Infrared Buffer Manager depicted in FIG. 3.
Figure 4B:
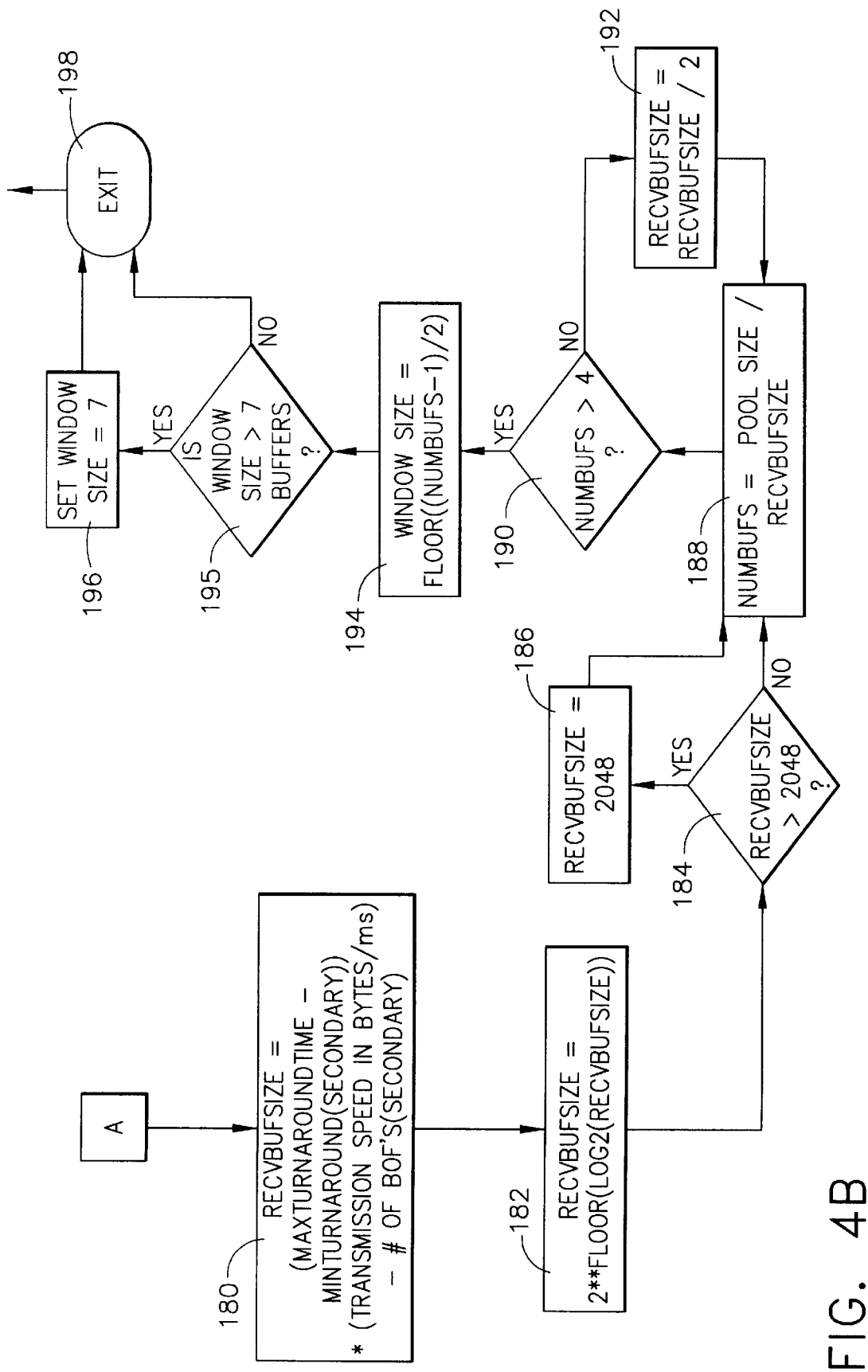

FIGS. 4A and 4B are a flow chart of the Reconfigure Buffers function 102. Starting with a function block 150, any remaining transmit information pertaining to this particular host only is discarded. The logic flow is now directed to a decision block 152 which determines whether or not there are any "used" buffers? This question is asking whether or not there are any receive buffers having unconsumed data at this time, and if the answer is YES, a function block 154 packs these buffers into contiguous memory at the top of the buffer in the free pool. The free pool size is then reduced, and the buffer allocation now begins and buffers are sized accordingly.

A function block 156 now sets the transmit buffer size, which for a printer is typically a very small size such as sixty-four (64) bytes. For the general case, the maximum transmit buffer size is equal to the minimum of either:
(1) {(maximum turnaround time−minimum turnaround time of primary) * (transmission speed in bytes per millisecond)− number of BOF's of primary}

OR (2) (maximum packet size of primary).

A decision block 158 now inspects the pool size to see if it is greater than 20 KBytes. If the answer is YES, a function block 160 now sets the number of transmit buffers to sixteen (16) for the case of the printer. If the answer is NO, a decision block 162 determines if the pool size is greater than 10 KBytes. If the answer is YES, a function block 166 sets the number of transmit buffers to eight (8), and if the answer is NO, a function block 164 sets the number of transmit buffers to four (4).

A decision block 170 now determines whether or not the connection method (i.e., the method of communications) for this port is SIR, which stands for "Slow Infrared." If the answer is YES, a function block 172 doubles the size of all transmit buffers, thereby allowing byte-stuffing which is required at SIR data transmission speeds, but which also requires a greater buffer size to support this byte stuffing process. A function block 174 now assigns the transmit buffers and adjusts the free pool size accordingly. The logic flow now arrives at a block "A" which directs the logic flow to FIG. 4B.

In FIG. 4B, the logic flow travels from block "A" to a function block 180, which sets the size of the receive buffers. The largest useful receive buffer size is equal to the minimum of either:

(1) {(maximum turnaround time−minimum turnaround time of secondary) * (transmission speed in bytes per millisecond)−number of BOF's of secondary}

OR (2) (maximum packet size of secondary).

Function block 182 now adjusts the receive buffer size to the next highest power of two (2). A decision block 184 now inspects the receive buffer size to determine if is greater than 2 Kbytes (which is the maximum data buffer size according to the IrDA protocol). If the answer is YES, a function block 186 reduces the receive buffer size to 2048 bytes (i.e., 2K).

A function block 188 now sets the number of receive buffers. The size of the remaining pool area is divided by the newly determined receive buffer size, and this gives the number of receive buffers to be allocated. A decision block 190 now determines whether or not the number of receive buffers is greater than four (4). If the answer is NO, a function block 192 divides the size of the receive buffers by two (2). The logic flow is then directed back to function block 188, which sets the number of buffers equal to the pool area size divided by the receive buffer size (which is just been divided by two).

The logic flow is again directed back to decision block 190, and this logical "DO-loop" will continue until the number of receive buffers is greater than four (4). Once that has been achieved, the logic flow travels out the YES output from decision block 190 to a function block 194.

At function block 194, the "window size" is set equal to the truncated integer value of the quantity: (the number of buffers minus one, divided by two). As related hereinabove, the window size refers to the number of data packets that can be transmitted and received within a single turnaround time interval. It is preferred to set aside at least as many allocated buffers (if they are available) needed to fill the window size so that the maximum number of data packets can be received, one packet per buffer.

The logic flow is now directed to a decision block 195 that determine whether or not the window size is greater than seven (7) buffers. If the answer is YES, then a function block 196 sets the window size equal to seven (7), which is the maximum number of packets than can be transmitted in a single turnaround time using the IrDA protocol. A function block 198 now exits from this routine.

There are preferably four different types of queues used in the communication system of the present invention: (1) a Free Transmit Buffers Queue, (2) a Free Receive Buffers Queue (or "free buffer list"), (3) a Used Transmit Buffers Queue, and (4) a Used Receive Buffers Queue (or "receive queue"). The "free" transmit and receive buffers are essentially empty buffers that are available for use by the IR port. The "used" transmit and receive buffers are buffers that presently contain some valid data.

Figure 5:
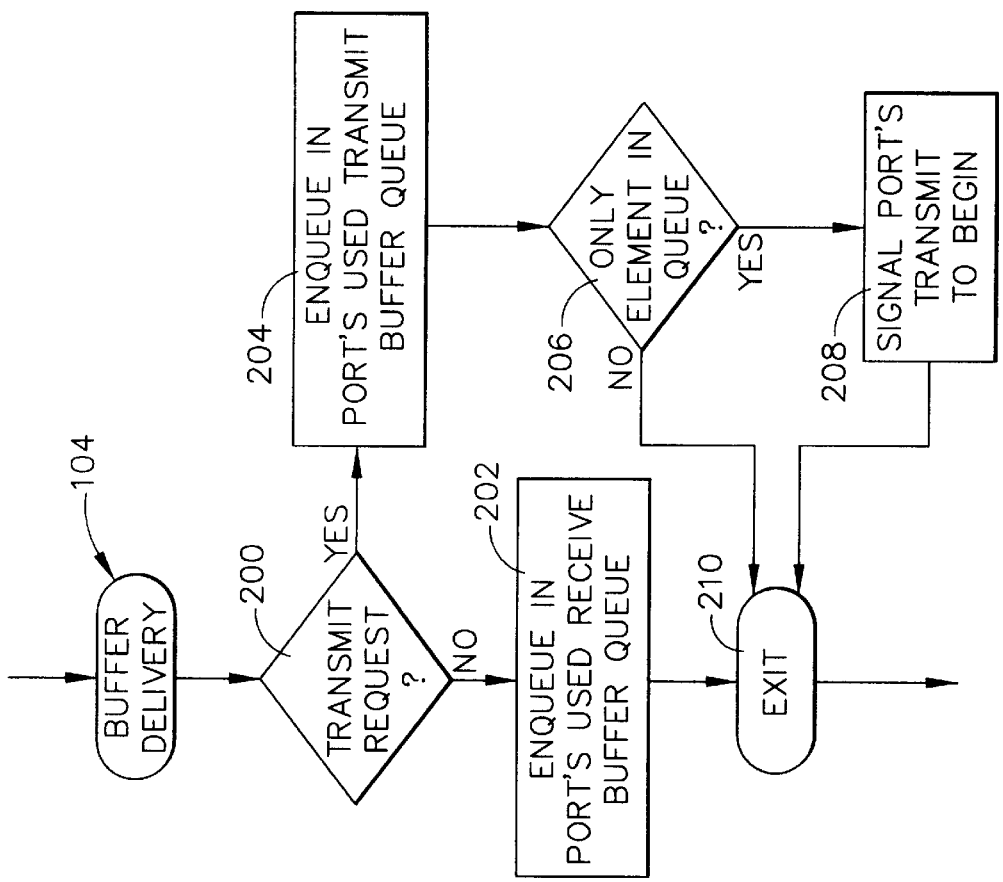
FIG. 5 is a flow chart of the "Buffer Delivery" function of the Infrared Buffer Manager depicted in FIG. 3.

FIG. 5 represents a flow chart of the Buffer Delivery function 104. Starting at a decision block 200, it is determined if a transmission or a reception is being requested. If this is a transmit request, a function block 204 will enqueue the data (i.e., add data to a queue) in the port's Used Transmit Buffer Queue. If instead this is a receive request, the logic flow is directed to a function block 202 that enqueues the data in the port's Used Receive Buffer Queue. It will be understood that the receive buffers enqueued in the Used Receive Buffer Queue could become backed up if the consumer fails to ask for data quickly enough. The consumer does so via the Data Request function 110, described in greater detail in reference to FIG. 7.

The logic flow is directed from function block 204 to a decision block 206 which asks if this data is the only element in the transmit queue. If the answer is YES, a function block 208 signals the IR port 18 to allow the transmission to begin. A function block 210 now exits from this routine.

Figure 6:
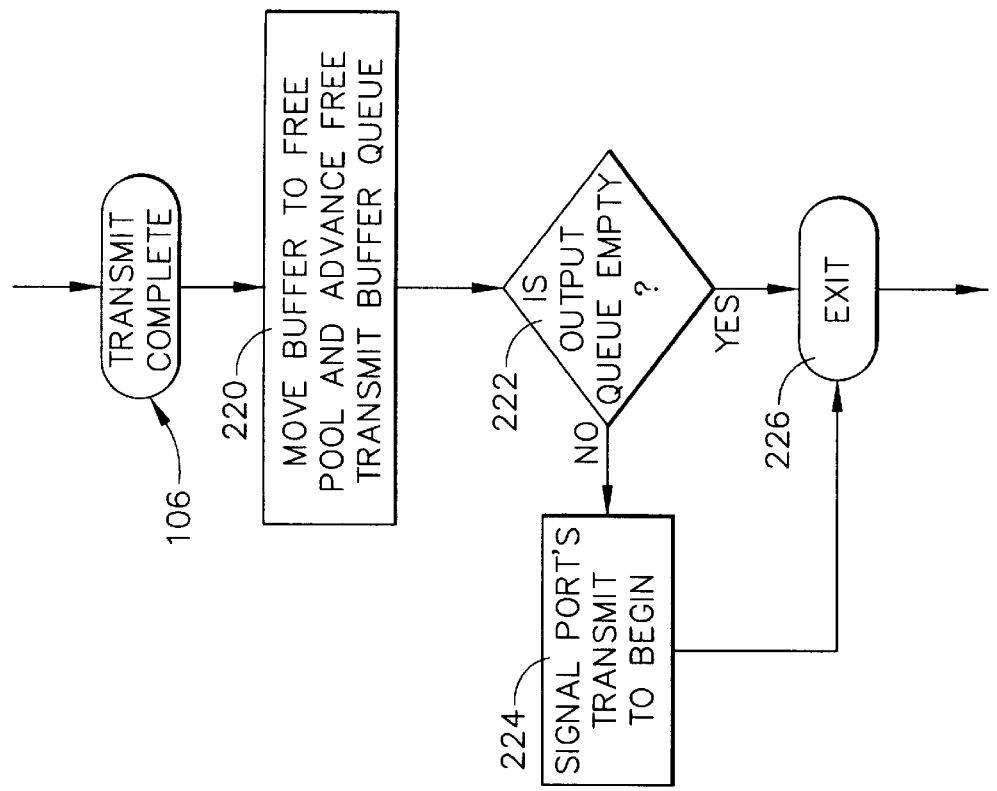
FIG. 6 is a flow chart of the "Transmit Complete" function of the Infrared Buffer Manager depicted in FIG. 3.

FIG. 6 is a flow chart of the Transmit Complete function 106. At a function block 220, the buffer is moved to the free pool, and the Free Transmit Buffer Queue is advanced. This removes the transmit buffer from the used queue, and sends it to the new transmit buffers queue. At a decision block 222, it is determined whether or not the output queue is empty. If the answer is NO, a function block 224 will signal the IR port 18 that the transmission can begin. The logic flow is now directed to a function block 226 which exits this routine.

FIG. 7 is a flow chart of the Data Request routine 110. A decision block 240 determines whether or not the Used Receive Buffer Queue is empty. If the answer is YES, then a function block 222 returns a message to the Data Consumer of "no data." If the answer is NO, that means there are presently some used receive buffers.

If there are used receive buffers, a function block 242 will deliver the unconsumed portions of the top buffer to the Data Consumer. This operation is performed one buffer at a time. An exit function 246 is now reached, which ends this routine.

FIG. 8 is a flow chart of the Data Discard function 112. A function block 260 marks an "indicated portion of buffer" at the top of the Used Receive Buffer Queue as being "consumed." After that has occurred, a decision block 262 determines whether or not the entire receive buffer has been consumed. If the answer is YES, a function block 264 moves the top buffer of the Used Receive Buffers Queue to the Free Receive Buffers Queue, and increments the Used Receive Buffer Queue. The logic flow now arrives at a function block 266 which exits this routine. The Data Discard function 112 essentially tells the IR Buffer Manager 100 that the data in the used receive queue has been consumed.

A second embodiment of an improved communications buffer system relating to the present invention is also provided which dynamically allocates the size and number of buffers for each of several different communications ports that are installed on a printer, while efficiently using the allocated memory so as to provide optimal throughput capability with respect to the allocated amount of memory. This second embodiment communications buffer system uses many of the principles described hereinabove with respect to the communications buffer system described in FIGS. 1–8.

The second communications buffer system is primarily designed to efficiently assign memory space for buffers used by the several communications ports from a predetermined amount of memory space (as a "pool" of memory) that has been allocated for external communications functions by the printer 10. It is preferred that the input buffer 22 be allocated a certain percentage of the printer's overall RAM, and then the control system described hereinbelow will determine how much of that allocated RAM shall be provided for the buffers used by each of the individual ports. Upon initialization of the printer, the pool of RAM that is allocated for the communications ports will be a relatively large quantity, however, each individual port will only be allocated a fairly small portion of that pool area of RAM. Essentially, it is preferred that each port upon initialization only be given a minimal buffer configuration that just sufficient to receive the first packet of print job information as it arrives at that port. When that occurs, the port then requests more memory from the pool area of RAM while the port is active.

The nominal size of the initialized minimal buffer configuration for the various ports of printer 10 depends upon the overall characteristics of the printer, including such parameters as its processing speed, print engine speed, size of its overall RAM system, memory size allocated for the total pool area, type and communications data rate of its ports and data links, and the like. It is preferred to keep the overall combined size of the initialized minimal buffer configuration for the various ports at a minimum, so as to provide the maximum flexibility in available RAM to be re-allocated during dynamic operations as the ports become active when receiving print jobs, or when receiving and responding to various commands or inquiries from, e.g., host computers and network supervisors. Therefore, the combined size of the minimal buffer configuration should be at a relatively small percentage of the total size of the pool area, and could run as low as 1% (or lower) of the pool area size, and would most likely be less than 50% of the pool area size.

In earlier conventional printing systems, each printer port is allocated a certain amount of memory space in RAM upon initialization. This can lead to very inefficient utilization of the printer's RAM resources, since some of the ports will be allocated a very large amount of RAM, when in fact, those particular ports may not be active for a large percentage of the printer's active use. For example, if a network port is installed in the printer, it may be allocated a substantial amount of RAM. At the same time, a parallel port could be installed on that same printer, and could be allocated a smaller amount of RAM. If the parallel port is almost exclusively used for that printer, then the larger amount of RAM allocated for the network port will go virtually unused for most of the printer's useful life, and that memory space will essentially remain non-used at all, leading to a very inefficient utilization of the printer's overall memory system.

In the second embodiment of the present invention, each of the printer's communications ports can be of a different type, and yet the memory utilization will be efficient regardless of the variety of types of ports. As will be described in greater detail below, only "active" ports are dynamically allocated any relatively large amounts of RAM out of the pool area of the printer's RAM that is made available for communications. If a particular port has accepted a print job, for example, and has completed the task of receiving that print job, then most of the RAM that was allocated for that port can now be re-allocated for one of the other ports as soon as that other port becomes active as it receives its own print job. In this manner, ports that are currently not active can be provided with only a minimum configuration size of RAM, while the ports that are currently active can use the rest of the RAM in the pool area. This provides the most efficient usage of the pool area of RAM that has been set aside for communications functions in printer 10.

Figure 9:
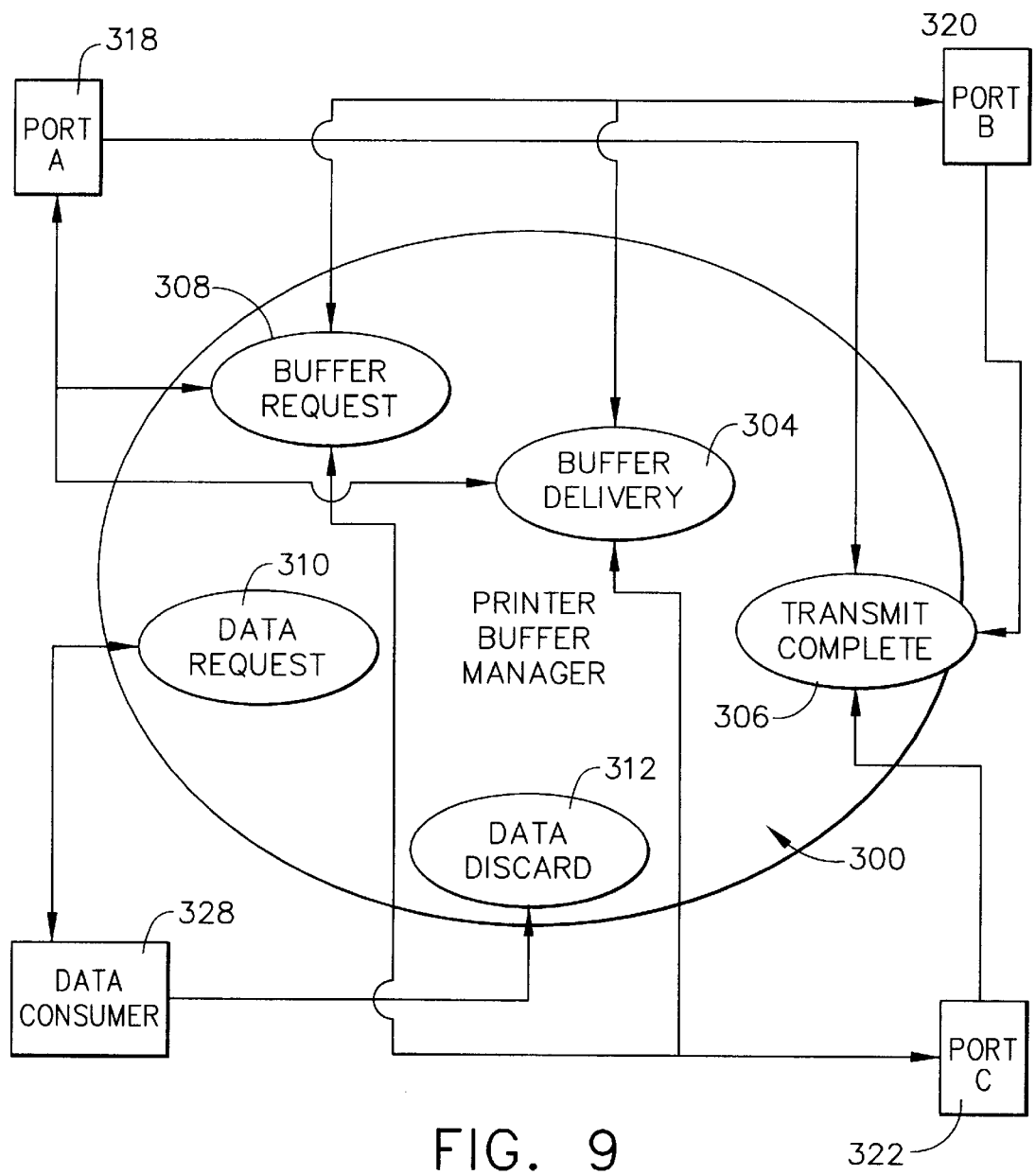
FIG. 9 is a diagrammatic view of the higher-level functions that are performed by a printer "Buffer Manager" for use with the multiple ports residing on a printer such as that depicted in FIG. 1.

FIG. 9 diagrammatically depicts the tasks of the printer's Buffer Manager, generally depicted by the reference numeral 300. The dynamic allocation of buffers, including their size, is particularly useful for IR ports, because such ports can have their communications parameters actively changeable after a discovery procedure. At the beginning of each dialog with a host computer, including the instance where the host computer is now attempting to send a print job to printer 10, the "active" port (if an IR port) will receive an initial communications message to determine the optimal data communications parameters that are commonly available to both the host computer and the printer. For other types of ports, in general their communications parameters would already be known by both the host computer and the printer, or by an intervening network.

On FIG. 9, three (3) ports are depicted, designated as "Port A" 318, "Port B" 320, and "Port C" 322. These individual ports 318, 320, or 322 can be of any type, including a network port or an IR port.

A data consumer 328 is also depicted on FIG. 9, and for a printer, this would generally be the interpreters and print engine of the printer itself. The data consumer communicates with certain functions of the printer's Buffer Manager 300, including a Data Request function 310, and a Data Discard function 312. Functions 310 and 312 have essentially the same tasks as similar Data Request and Data Discard functions 110 and 112, respectively, as described for FIG. 3 hereinabove.

Other tasks managed by the printer's Buffer Manager 300 on FIG. 9 include a Buffer Delivery function 304 and a Transmit Complete function 306. These functions operate essentially the same as similar functions 104 and 106 on FIG. 3. The main difference is that both functions 304 and 306 communicate with each of the ports 318, 320, and 322. Moreover, a very different Buffer Request function 308 is provided on FIG. 9 which contains many new tasks as compared to the earlier described Buffer Request and Buffer Delivery functions that were found on FIG. 3. Buffer Request function 308 also communicates directly with ports 318, 320, and 322. The details of the Buffer Request function 308 are found on FIG. 11 and its accompanying description herein.

Figure 10:
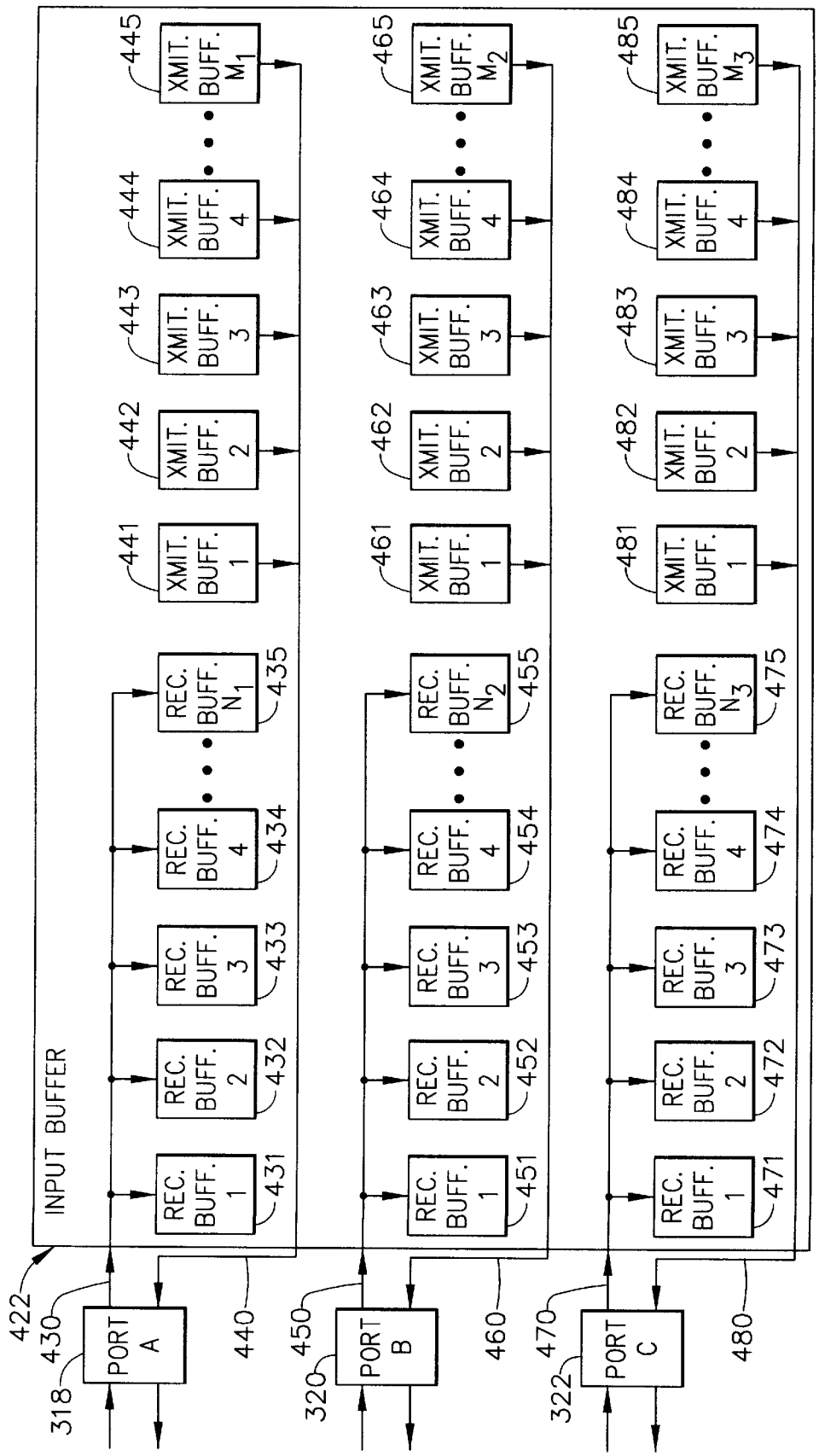
FIG. 10 is a diagrammatic view of portions of the input buffer of the printer depicted in FIG. 9.

To accomplish the tasks that are preferably performed by the second embodiment of the present invention, each of the ports 318, 320, and 322 will preferably be allocated multiple receive buffers and multiple transmit buffers, as depicted on FIG. 10. Port A at reference numeral 318 receives data from an external device and further communicates that data over a signal line 430 into the input buffer 422. Port A has "N1" number of receive buffers, designated by the reference numerals 431, 432, 433, 434, and 435. Messages sent by the printer will be transmitted along a signal line 440 through Port A, and these messages are temporarily stored in "M1" transmit buffers designated by the reference numerals 441, 442, 443, 444, and 445.

Port B at 320 receives data and further communicates such data along a signal line 450 into "N2" receive buffers that are part of the input buffer 422. These receive buffers are designated by the reference numerals 451–455. Also residing in the input buffer 422 are "M2" transmit buffers 461–465, which temporarily store messages to be sent by the printer along a signal line 460 through Port B.

Port C at 322 receives data and further communicates that data along a signal line 470 into "N3" receive buffers 471–475. A corresponding set of "M3" transmit buffers 481–485 temporarily store messages to be sent by the printer and then transmitted along a signal line 480 through Port C.

It will be understood that the number of receive buffers for each of the various ports of printer 10 can be different, hence the designations "N1", "N2", and "N3" for the number of receive buffers assigned to the various ports depicted on FIG. 10. Correspondingly, the number of transmit buffers also can be different for each of the various ports of printer 10. It will be further understood that the number of receive buffers and transmit buffers do not necessarily have to match one another for a single port. It will also be understood that the values for any of the variables N1–N3, and M1–M3, could be as small as the number "1".

As related hereinabove, it is preferred to create multiple transmit buffers for ports that are connected to a network or otherwise have overhead messages that need to be transmitted from the printer to the host computer in many situations. Furthermore, it is preferred to have multiple receive buffers for each port, not only to handle network-type overhead messages, but also to handle multiple packets of data that are received by any of the ports, whether these are network packets, or are infrared protocol packets that are received via an IR port. As related above, a communications port that is configured for the IrDA protocol will preferably have associated therewith at least seven (7) different receive buffers, since the maximum number of packets that can be received over such an IR port during a single communications session is seven (7).

It is preferred that each port that is configured on printer 10 have the same four (4) queues as were described for an infrared port hereinabove. In other words, each port of the second embodiment of the present invention should have a Free Transmit Buffers Queue, a Free Receive Buffers Queue, a Used Transmit Buffers Queue, and a Used Receive Buffers Queue. The "Free" transmit and receive buffers are empty buffers that are available for use by the port, whereas the "Used" transmit and receive buffers presently contain some valid (i.e., unconsumed) data. As related above, the handling of data in the ports and in the various queues will be performed according to the Buffer Delivery function 304, Transmit Complete function 306, Data Request function 310, and Data Discard function 312, which essentially have the same functions as are described in FIGS. 5–8 (which describe similar functions for FIG. 3).

All buffers, upon initialization, start as "free" buffers. Once a buffer contains data to be processed, the communications port calls the Buffer Delivery function, and the buffer becomes reclassified as "used." Once all of the data is consumed for a particular used buffer, then the consumer calls the Data Discard function, and the buffer becomes reclassified as "free." It will be understood that the various queues each contain pointers that initially point to the beginning of each of the buffers that are assigned to that queue. Once data starts being added to the buffers, then the pointer in the queue that is associated with that buffer will move accordingly. The configuration of the buffers can be as a "ring buffer," or a "linear buffer," or of any other type of configuration of buffer without departing from the principles of the present invention.

Figure 11:
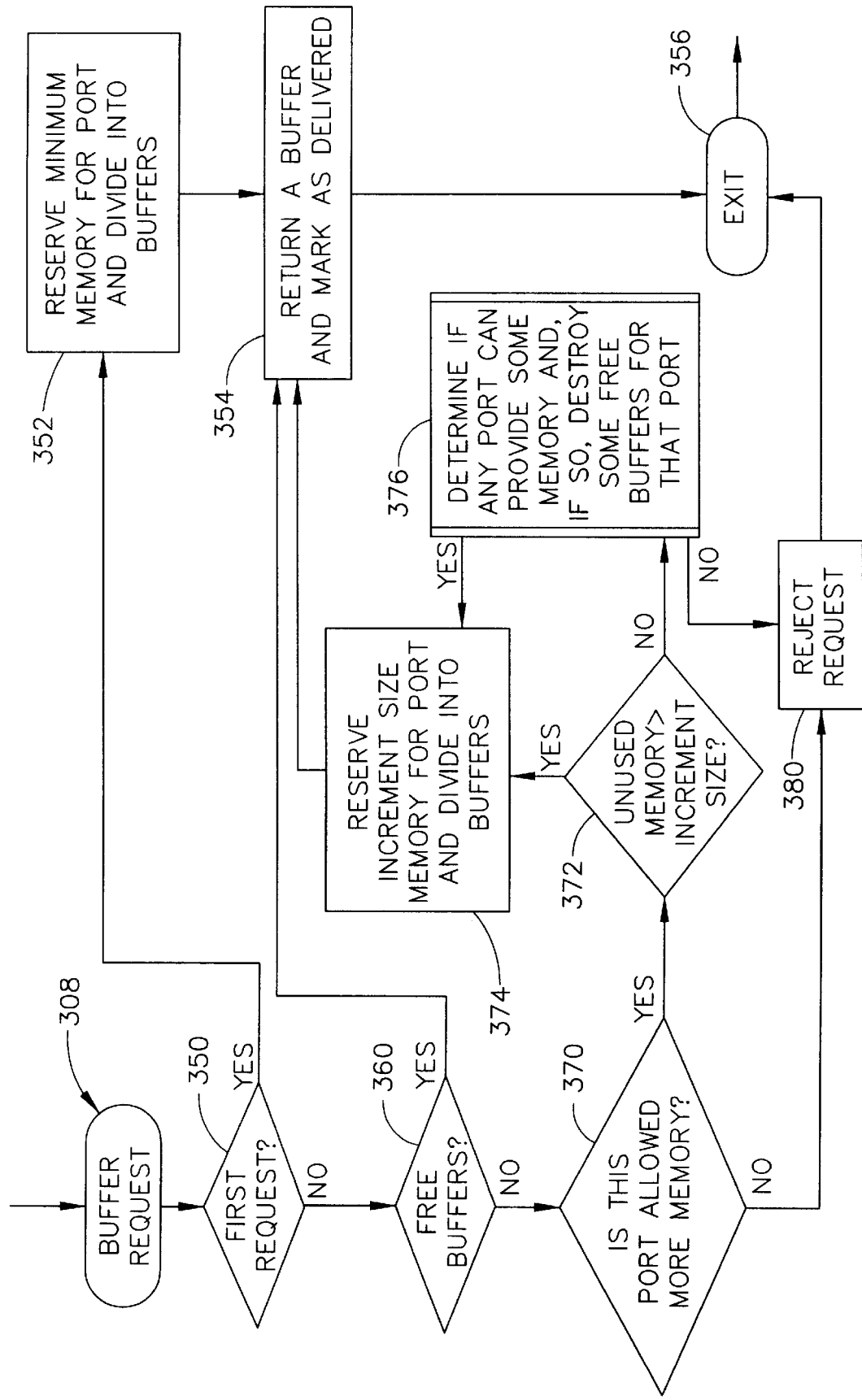
FIG. 11 is a flow chart of the "Buffer Request" function of the printer Buffer Manager depicted in FIG. 9.

FIG. 11 shows a flow chart for the new Buffer Request function 308 used in the second embodiment of the present invention. A decision block 350 determines whether or not this is the first buffer request after the printer's initialization. For infrared ports, this decision block 350 will result in a YES answer once for the transmit buffer of the port and once for the receive buffer of the port. For other types of ports, the YES result could be reserved only for the receive buffer request, although it is preferred that it occur for both transmit and receive buffers.

If the result is YES, a function block 352 reserves a minimum amount of memory for this particular port and divides it into individual buffers. This will be true for either a set of transmit or receive buffers, depending upon which type of buffer request was made upon entry into this function 308.

A function block 354 now "returns" a buffer (i.e., either a transmit buffer or a receive buffer), and "marks" that buffer as having been delivered. At this point in the logic flow, this buffer is still in the Free Buffers Queue (either transmit or receive), although it will likely become used soon. In the preferred embodiment, function block 354 returns only a single buffer at a time, so if multiple buffers are needed, the logic flow will pass through function block 354 multiple times. After function block 354 returns a single buffer, Buffer Request function 308 exits at a step 356.

If the result at decision block 350 was NO, another decision block 360 now determines whether or not there are any buffers in the Free Queue, either for a transmit or receive queue, depending upon the type of buffer that was originally requested upon entry into this function 308. If the answer is YES, then function block 354 will return a single buffer and mark that buffer as delivered. After that occurs, the function exits at step 356.

If the result at decision block 360 is NO, then a decision block 370 determines whether or not this particular port is allowed more memory space within the pool of memory allocated for transmit and receive buffers for the communications ports. If the answer is NO, then a function block 380 rejects the request, and the Buffer Request routine 308 exits at step 356. If the result at decision block 370 is YES, then a decision block 372 determines if the unused memory (or "free" memory) that is still available within the printer's pool of memory for the communications ports is greater in size than an "increment size" for this particular type of port.

The term "increment size" relates to a minimum useful size of a buffer (or buffers) that will effectively be usable for the type of communications port to which this buffer(s) will be associated. The increment size could be for only a single buffer, or could contain several buffers, depending upon the size of a minimum useful "chunk" of memory for that particular type of port. Typically a port that requires a dialog (such as a network port) would need multiple buffers. Therefore, the amount of RAM that needs to be allocated for this type of port will need to be a certain minimum size that can hold the multiple buffers for this type of port, or there would be no point in allocating any RAM whatsoever for that port at this time. When making such an allocation, it is preferred that each individual buffer consist of contiguous RAM, however, the entire increment size (if it contains more than one buffer) need not necessarily consist entirely of contiguous RAM.

If the result is YES at decision block 372, then a function block 374 will reserve the increment size of RAM for this port and divide it into the appropriate number of buffers.

This could be only a single buffer for certain types of ports. The method for performing this memory reservation and division into buffers preferably will occur according to some of the principles set forth hereinabove in the description relating to the flow chart of FIGS. 4A and 4B, which is a routine that reconfigures the buffers for the first embodiment of the present invention.

One major difference at function block 374 is that the size of the memory being allocated or reserved at this particular point in time is already fixed by the predetermined "increment size" for this type of port. In other words, there will not be any steps taken to inspect how much of the pool is left available, such as in FIG. 4A with respect to the amount of memory available for transmit buffers. In a similar manner, the number of receive buffers at function block 374 will not depend upon the available pool size (as in function block 188 of FIG. 4B) but will instead depend upon the increment size for this port's receive buffers. Other than these general differences between the flow charts of FIGS. 4A, 4B and FIG. 11, the number and size of the individual buffers that are created at function block 374 preferably will be determined along similar lines as was described in the reconfiguration of buffers function in relation to FIGS. 4A and 4B.

If the result at decision block 372 was NO, then a function block 376 determines if any other port can provide some memory for the current active port, and if so, some of the free buffers for the other port will be destroyed in favor of the current active port. Function block 376 actually is a routine that is described in greater detail in a flow chart depicted in FIG. 12.

Before describing the steps of the flow chart of FIG. 12, a more detailed treatment of the preferred settings for various types of input/output communications ports used in a preferred printer will be described. At decision block 370, the main question was whether or not this particular port would be allowed to obtain more memory for its buffers. For different types of ports, the maximum percentage of the "total port memory pool" will be a different percentage. Even if the printer is relatively dormant and a single print job arrives at a single port, if the particular port is a "fast" port, then the percentage of the total port memory pool provided for that port's buffers will not be near 100%, because the fast-type port in combination with a "fast" data communications link can usually stay ahead of the consumer (i.e., the printer's interpreters and print engine). Therefore, it would be best to not provide almost the entire amount of the free memory pool to such a fast port/data link combination, in case a relatively "slow" port suddenly begins to receive a print job that really needs buffers as soon as possible.

On the other hand, when the printer happens to be relatively dormant and a print job suddenly arrives at a relatively "slow" port, then it is preferred to allocate nearly the entire amount of the total port memory pool to buffers that will service that particular port. In this situation, the consumer (i.e., the interpreters and print engine) will likely stay ahead of the port and data link combination, so the critical process in this situation with respect to the printer's overall throughput is the actual reception and initial buffering and processing of the incoming print data being received at this relatively slow port. Another print job may suddenly arrive at one of the other ports, however, if the first print job has already begun being printed by the print engine 36, then it really doesn't much matter how fast or slow the second port receives and buffers incoming print data, at least not as far as the operations of the printer are concerned.

Of course, it would be best if the printer can take in the entire print job as soon as possible, so as to release the host computer or its associated network from transmitting that data for the print job that began arriving second in this example. If the second print job arrives at a relatively fast port, then the fast port/data link combination will usually stay ahead of the interpreters that need to process the data, so a relatively small percentage of the free space of the total port memory pool may suffice in that situation. If, on the other hand, the second print job arrives at another relatively slow port, then the lesser of the two evils would appear to be to allow the first print job to be buffered and sent to the data consumer 328 as soon as possible, and then the second port can obtain more of the total port pool memory pool after the first print job has been fully buffered and passed off to the data consumer. This will be described in greater detail below.

In view of these considerations described above, it is preferred to limit the maximum amount of the space in the total port memory pool of RAM that has been allocated by the printer for the transmit and receive buffers used in input/output communications. As an example, the maximum percentage allocations of the total port memory pool RAM for various types of ports could be as follows:

| | |
|---|---|
| Serial port | 90% of pool area. |
| Slow IR ("SIR") | 90% of pool area. |
| 1 Mbit/sec IR ("MIR") | 60% of pool area. |
| Fast IR ("FIR") | 40% of pool area. |
| Parallel port | 50% of pool area. |
| Ethernet (INA) | 20% of pool area. |
| Token Ring (INA) | 20% of pool area. |

The above numbers can, of course, be adjusted for different printing systems to achieve maximum efficiency, without departing from the principles of the present invention. It will be understood that various new types of communications ports will become available in the future, and if anything they will likely be faster than what is available today. If all of the ports used in standard printers become quite fast, then the printer's designer must perform an analysis that will essentially become a balancing act to see which of the faster ports should still receive a greater percentage of the total port memory pool space with respect to other types of faster ports. However, it seems likely that there will always be communications technologies that are faster or slower than other types of communications technologies, at least with respect to the types of ports that will be supplied with standard printers.

Referring again to FIG. 12, the routine 376 is used to essentially "steal" memory from another port in favor of the "current active port" that needs more buffers as soon as possible. Naturally, the system designer cannot merely allow the most recent port that has received a print job to steal memory from just anywhere, and so an analysis must be made as to which of the other ports that were previously allocated some of the free space in the total port memory pool and how much of their buffers presently contain free space versus used space.

Starting at a decision block 500, the printer determines if any other port has more RAM allocated to that port than its minimum amount, and in which the port is not "revealing" any data at this time. The term "revealing" means whether or not the buffers for that port have any data for the consumer 328. After all, there is no point in attempting to take RAM space away from a port that is already being buffered at its minimum RAM allocation. If the answer is NO, then the current active port, starting at a decision block 510, will use a different criteria for determining whether or not it can take some memory from another port.

On the other hand, if the result at decision block 500 is YES, then a function block 502 will take RAM from one or more other ports up to the increment size of the current active port. As related above, the "increment size" is a quantization of the amount of memory space that will be a minimum "chunk" of RAM that will be useful for that particular type of port. While this particular port may ultimately desire to obtain more than one increment size of RAM for its buffers, it is preferred to allow that port to "steal" only one increment size at a time, and then if it still requires further buffer space, it can again go through this analysis of taking memory from another port according to the routine 376. Once some of the RAM has been acquired from another port at function block 502, the logic flow is directed to a decision block 504, which determines whether or not function block 502 has freed sufficient memory that comprises one increment size of the current active port. If so, the logic flow is directed to a decision block 514, which will be discussed in greater detail below. Otherwise, the logic flow is directed to decision block 510.

At decision block 510, the printer determines whether or not any other active port has a print job of a lower priority than the print job of the current active port. If the answer is NO, then a function block 520 essentially acknowledges a failure to appropriate sufficient RAM for the current active port. When that occurs, the logic flow is directed along the arrow 522 on FIG. 12 back to a "Reject Request" function block 380 on FIG. 11. In that situation, no further memory will be allocated at this particular moment, and the incoming print data will not be buffered at this time.

If the result at decision block 510 was YES, then a function block 512 will take up to an increment size (of the current active port) of RAM from any other active port that has sufficient RAM in its Free Buffer Queue. What essentially occurs in function block 512 is to seek a print job that has a lower priority and that may not have used up all of its receive buffers as it has been inputting data from its particular port. Therefore, some of its buffers will still be classified as "free," and these buffers could be re-allocated to the current active port in situations where the current active port is receiving a print job of a higher priority. This would, of course, occur if the print job being received at the current active port has already started printing at the print engine 36, even though there is still some more print data arriving at its particular port. In this situation, the print job being received at the current active port naturally would have the very top priority in the printer's system (at least for a printer having a single print engine). It would then be critical for that current active port to bring in its print data and pass it through its buffers to the interpreters and print engine as soon as possible, or there could be a print overrun which could potentially occur for a particular sheet of print media in a constant velocity printer, such as a laser printer.

Even if there was no danger of an actual print overrun occurring, once a particular print job begins to print, it is always desirable to finish that print job as soon as possible, because other print jobs will be wanting to be printed as soon as possible thereafter. In typical printing systems, separate print jobs are not intermingled as they are being printed by a single print engine.

The logic flow is now directed to the decision block 514, which initially combines all of the RAM that has been freed by the function blocks 502 and 512. The important criterion at decision block 514 is to determine whether or not the combined freed RAM will provide sufficient RAM to comprise at least one increment size for the current active port. If the answer is NO, then function block 520 acknowledges a failure to appropriate sufficient RAM for the current active port. When that occurs, function block 380 rejects the request for more memory by that port.

On the other hand, if the result at decision block 514 is YES, then a function block 516 will defragment all of the freed RAM to acquire the appropriate number of buffers for the current active port. It should be remembered that it is preferred that each individual buffer consist of contiguous RAM, and it may be that, although sufficient RAM space in pure memory locations has been freed, there nevertheless may not be sufficient contiguous RAM locations to provide the appropriate buffers for the current active port. If that occurs, then the logic flow is directed along the dashed arrow 518 to the function block 520 which acknowledges a failure to appropriate sufficient RAM for the current port, and the request will be rejected at function block 380.

Figure 12:
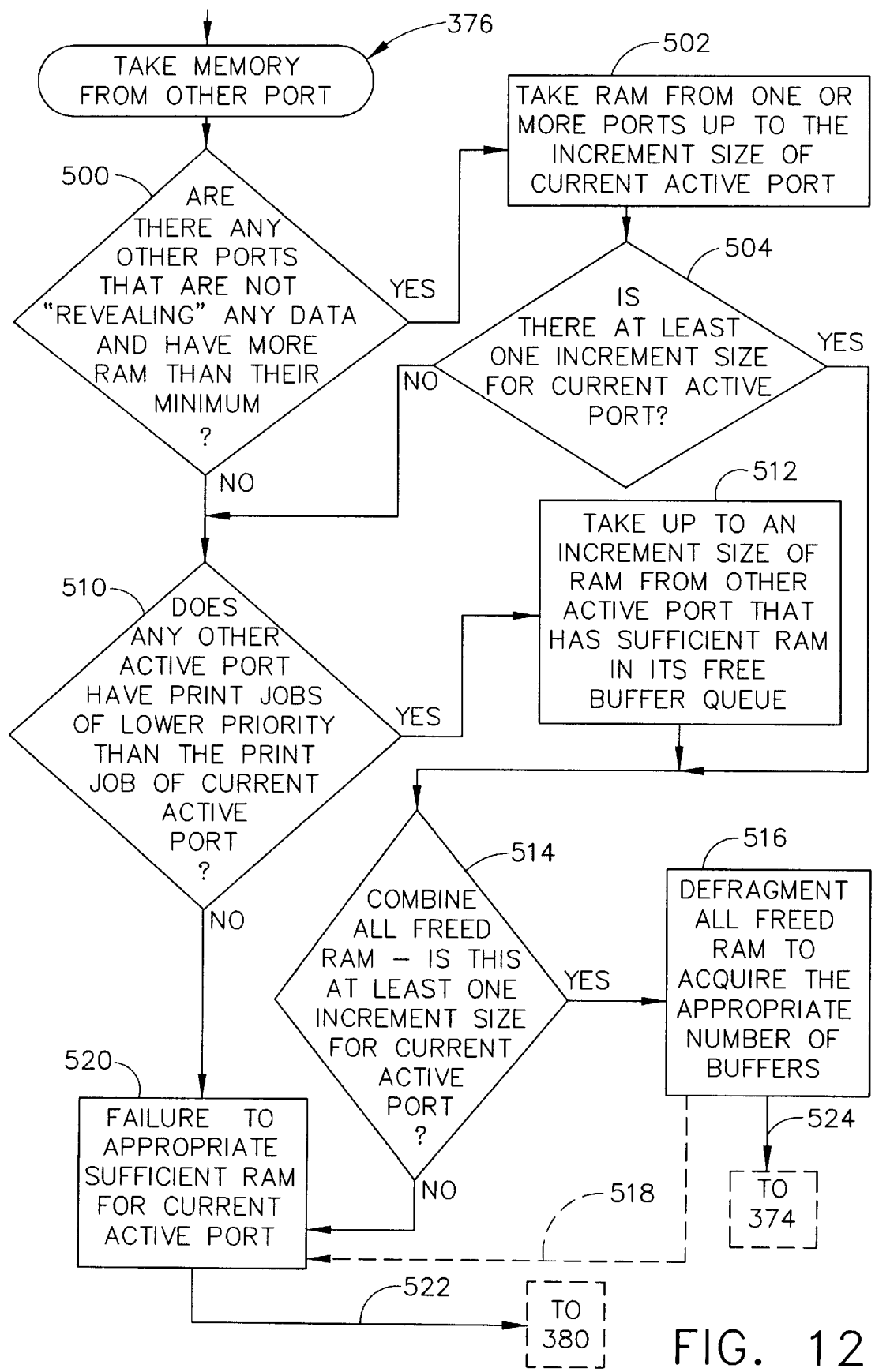
FIG. 12 is a flow chart of a "Take Memory From Other Port" routine that is part of the flow chart of FIG. 11.

Assuming that the appropriate number of buffers can be created with the preferred contiguous RAM per buffer, then the logic flow is directed along arrow 524 on FIG. 12 to the function block 374 on FIG. 11. In that situation, the increment size of memory is reserved for this particular port and is divided into the appropriate buffers. After that occurs, function block 354 returns a single buffer and marks that buffer as being delivered. The routine 308 exits at 356.

An example of memory allocation of the total port memory pool is depicted on FIG. 13, which begins with a step 1, upon initialization of the printer. At initialization, each of five (5) ports "A", "B", "C", "D", and "E" are allocated only their minimum configurations of buffer space in RAM. The rest of the memory pool is "free" at this time, and totals 100% just after initialization. In step 2 of FIG. 13, a SIR (slow infrared) port becomes active, and this is designated as "Port B" for this example. Using the preferred maximum allocation settings for an SIR, Port B is allocated 90% of the pool area in RAM, and only 10% will remain classified as free at this time.

In step 3 of FIG. 13, Port B has completed its task and has become inactive. In addition, a MIR (medium-speed IR port at 1 Mbit/sec) becomes active, which is designated as Port C. Using the preferred maximum allocations, Port C is allocated 60% of the (total port) memory pool area. Port B is now reduced from 90% to 40%, although it currently does not even need that 40% since it is presently inactive. However, if Port B should suddenly become active again at this moment, then it would be "stuck" at 40% of the memory pool, because Port C has already been allocated its 60%, and will not give that up to Port B unless the new print job arriving at Port B has a higher priority level than the print job being received at Port C.

At step 4 of FIG. 13, Port C has finished its task and is now inactive. In addition, a serial port has become active, which is designated in this example as Port D. Using the preferred maximum allocations of the total port memory pool area, Port D is allocated a total of 90% of the pool area of RAM. Since Port C was the most recent active port, its still retains 10% of the pool area, because Port D is not allowed to obtain the full 100% of the pool area. Consequently, the contiguous memory locations of the pool area are interrupted by the 10% amount of pool area that remains allocated to Port C, as can be seen on FIG. 13. Therefore, Port D is allocated the first 40%, and the last 50% of the contiguous memory locations of the pool area of RAM in the printer. This, of course, assumes that the pool area of RAM comprised one contiguous set of memory locations in the first place, which may not be the case in an actual implementation of a printer. It can be easily seen that, after multiple print jobs arrive and are processed and printed, the memory allocations for the various ports will become fragmented, which is why it is desirable to defragment any freed RAM at function block 516 in situations where that function is reached in the logic flow of the present invention.

The last step on FIG. 13 is designated as "alternate Step 4." In this example, although a serial port has become active (i.e., Port D), the earlier active port (i.e., Port C) also remains active. In that situation, Port C will not automatically give up any of its allocated RAM, and initially will retain 60% of the total port memory pool area of the RAM. Therefore, Port D only can obtain 40% of the pool area at the time it first becomes active, even though it would like to obtain 90% of the pool area. If the print job being received at Port C has a higher priority than the print job being received at Port D, then Port D will never be allowed to obtain more than 40% of the pool area until the print job has been completely received and buffered through Port C. Once that occurs, then Port D can obtain more of the pool area, and the memory chart will then look more like that depicted for Step 4.

In the examples of FIG. 13, Ports A and E were never active, but they could, of course, start receiving print jobs and further split the allocations of the pool area so that there will be even more fragmented portions of RAM for the various ports. It will be understood that other schemes of allocating RAM in the total port memory pool area could be implemented without departing from the principles of the present invention. For example, one obvious variation would be to immediately re-allocate RAM no longer used by a port that has gone inactive, so that this RAM becomes classified as "free", instead of remaining allocated to that now inactive port. One disadvantage of performing that variation is that it can be viewed as an unnecessary task at that time, and will temporarily slow down the throughput of the printer if there are other important tasks being performed that require the printer's processing power. This is merely an obvious example of ways that the implementation of the buffering scheme can be changed without departing from the principles of the present invention.

On FIG. 12, it should be appreciated that the larger the increment size of the current active port, the more difficult it will be to combine sufficient RAM freed at decision block 514 and at function block 516 to acquire the appropriate number of buffers that will equal or exceed the increment size for the current active port. Therefore, at function blocks 502 and 512 it is preferred that when RAM is being "stolen" from another port, that such RAM should be taken from all possible other ports at each of these function block operations. By doing so, when all of such freed RAM is combined and perhaps defragmented at blocks 514 and 516, then the printer is more likely to- end up with sufficient RAM to acquire the appropriate number of buffers for the current active port.

It will be understood that the principles of the present invention are also applicable to general-purpose computer systems that have input/output communications ports. Such computer systems also have a great need to provide transmit and receive buffers for their communications ports, since the operations of the computer's processing circuit (e.g., a microprocessor) can become quite busy with executing resident computer programs without being tied down to interfacing and processing data messages that are either being received at or to be transmitted by one or more of the communications ports. In the case of a computer, it may be likely that the transmit side of the communications ports will be busier than the receive side, so much so that the number and size of the transmit buffers may be larger than the receive buffers for most of the ports. The computer will definitely be well served if its Random Access Memory (RAM) resources are used efficiently, and the second embodiment of the present invention is quite capable of dynamically allocating such buffers for the computer's various ports without impinging upon the remaining portions of the computer's RAM, thereby providing sufficient RAM for buffers only when needed by the port(s).

The foregoing description of a preferred embodiment of the invention has been presented for purposes of illustration and description. It is not intended to be exhaustive or to limit the invention to the precise form disclosed. Obvious modifications or variations are possible in light of the above teachings. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

We claim:

1. A method for allocating memory space for communications port buffers in a computer system having a memory storage device, a plurality of communications ports, and a processing circuit, said method comprising the steps of:
    (a) creating a "pool area" of memory elements within said memory storage device;
    (b) for each of said plurality of communications ports, initially allocating some memory elements from said pool area to create a minimum configuration of at least one buffer, wherein the total combined amount of memory space for said initially allocated at least one buffer for all of the plurality of communications ports is only a relatively small percentage of the total size of said pool area; and
    (c) dynamically allocating further memory elements from said pool area for said at least one buffer that is associated with one of said plurality of communications ports that has become active.

2. The method as recited in claim 1, wherein said plurality of communications ports are of different types.

3. The method as recited in claim 2, wherein each of said plurality of communications ports is one of a serial port, parallel port, network port, infrared port, Ethernet port, and token ring port.

4. The method as recited in claim 1, wherein said at least one buffer associated with each of said plurality of communications ports is configured as a plurality of buffers of a particular size, wherein the number and size of the plurality of buffers is different for each type of said plurality of communications ports.

5. The method as recited in claim 1, further comprising the steps of:
    (a) activating a first port of said plurality of communications ports and allocating a first quantity of memory from said pool area for use as at least one buffer associated with said first port;
    (b) activating a second port of said plurality of communications ports and allocating a second quantity of memory from said pool area for use as at least one buffer associated with said second port, wherein said second quantity of memory is less than a desired nominal amount for use with said second port; and
    (c) inspecting the status of said first quantity of memory and, if said first port is no longer active, re-allocating at least a portion of said first quantity of memory to said second port from said first port for additional use as at least one buffer associated with said second port.

6. The method as recited in claim 1, further comprising the steps of:
   (a) activating a first port of said plurality of communications ports and allocating a first quantity of memory from said pool area for use as at least one buffer associated with said first port;
   (b) activating a second port of said plurality of communications ports and allocating a second quantity of memory from said pool area for use as at least one buffer associated with said second port, wherein said second quantity of memory is less than a desired nominal amount for use with said second port; and
   (c) inspecting the status of said first quantity of memory and, if said first port is still active, determining whether a first data message at said first port has a higher or lower priority level than a second data message at said second port, and if the priority level of said second data message is greater than the priority level of said first data message, further inspecting said at least one buffer associated with said first port to determine if there is any "free" buffer, and if so, re-allocating at least a portion of said first quantity of memory to said second port from said first port for additional use as at least one buffer associated with said second port.

7. The method as recited in claim 1, wherein said computer system is resident on a printing apparatus.

8. A method for allocating memory space for communications port buffers in a printer having a memory storage device, a plurality of communications ports, a print engine, and a processing circuit, said method comprising the steps of:
   (a) creating a "pool area" of memory elements within said memory storage device;
   (b) for each of said plurality of communications ports, initially allocating some memory elements from said pool area to create a minimum configuration of at least one buffer, wherein the total combined amount of memory space for said initially allocated at least one buffer for all of the plurality of communications ports is only a relatively small percentage of the total size of said pool area; and
   (c) dynamically allocating further memory elements from said pool area for said at least one buffer that is associated with one of said plurality of communications ports that has become active.

9. The method as recited in claim 8, wherein said plurality of communications ports are of different types.

10. The method as recited in claim 9, wherein each of said plurality of communications ports is one of a serial port, parallel port, network port, infrared port, Ethernet port, and token ring port.

11. The method as recited in claim 8, wherein said at least one buffer associated with each of said plurality of communications ports is configured as a plurality of buffers of a particular size, wherein the number and size of the plurality of buffers is different for each type of said plurality of communications ports.

12. The method as recited in claim 8, further comprising the steps of:
   (a) activating a first port of said plurality of communications ports and allocating a first quantity of memory from said pool area for use as at least one buffer associated with said first port;
   (b) activating a second port of said plurality of communications ports and allocating a second quantity of memory from said pool area for use as at least one buffer associated with said second port, wherein said second quantity of memory is less than a desired nominal amount for use with said second port; and
   (c) inspecting the status of said first quantity of memory and, if said first port is no longer active, re-allocating at least a portion of said first quantity of memory to said second port from said first port for additional use as at least one buffer associated with said second port.

13. The method as recited in claim 8, further comprising the steps of:
   (a) activating a first port of said plurality of communications ports and allocating a first quantity of memory from said pool area for use as at least one buffer associated with said first port;
   (b) activating a second port of said plurality of communications ports and allocating a second quantity of memory from said pool area for use as at least one buffer associated with said second port, wherein said second quantity of memory is less than a desired nominal amount for use with said second port; and
   (c) inspecting the status of said first quantity of memory and, if said first port is still active, determining whether a first print job received at said first port has a higher or lower priority level than a second print job received at said second port, and if the priority level of said second print job is greater than the priority level of said first print job, further inspecting said at least one buffer associated with said first port to determine if there is any "free" buffer, and if so, re-allocating at least a portion of said first quantity of memory to said second port from said first port for additional use as at least one buffer associated with said second port.

14. A computer system, comprising:
   (a) a memory circuit, said memory circuit containing a "pool area" of memory elements;
   (b) a plurality of communications ports that are in communication with at least one external device and with said memory circuit; and
   (c) a processing circuit that is configured to control the flow of data between said memory circuit and said plurality of communications ports, said processing circuit also being configured to initially allocate some memory elements from said pool area to create a minimum configuration of at least one buffer for each of said plurality of communications ports, wherein the total combined amount of said initially allocated at least one buffer for all of the plurality of communications ports is only a relatively small percentage of the total size of said pool area, and wherein said processing circuit is further configured to dynamically allocate further memory elements from said pool area for said at least one buffer that is associated with one of said plurality of communications ports that has become active.

15. The computer system as recited in claim 14, wherein said plurality of communications ports are of different types.

16. The computer system as recited in claim 15, wherein each of said plurality of communications ports is one of a serial port, parallel port, network port, infrared port, Ethernet port, and token ring port.

17. The computer system as recited in claim 14, wherein said at least one buffer associated with each of said plurality of communications ports is configured as a plurality of buffers of a particular size, wherein the number and size of the plurality of buffers is different for each type of said plurality of communications ports.

18. The computer system as recited in claim 14, wherein said processing circuit is further configured to: (a) activate a first port of said plurality of communications ports and allocate a first quantity of memory from said pool area for use as at least one buffer associated with said first port; (b) activate a second port of said plurality of communications ports and allocate a second quantity of memory from said pool area for use as at least one buffer associated with said second port, wherein said second quantity of memory is less than a desired nominal amount for use with said second port; and (c) inspect the status of said first quantity of memory and, if said first port is no longer active, re-allocate at least a portion of said first quantity of memory to said second port from said first port for additional use as at least one buffer associated with said second port.

19. The computer system as recited in claim 14, wherein said processing circuit is further configured to: (a) activate a first port of said plurality of communications ports and allocate a first quantity of memory from said pool area for use as at least one buffer associated with said first port; (b) activate a second port of said plurality of communications ports and allocate a second quantity of memory from said pool area for use as at least one buffer associated with said second port, wherein said second quantity of memory is less than a desired nominal amount for use with said second port; and (c) inspect the status of said first quantity of memory and, if said first port is still active, determine whether a first data message at said first port has a higher or lower priority level than a second data message at said second port, and if the priority level of said second data message is greater than the priority level of said first data message, further inspect said at least one buffer associated with said first port to determine if there is any "free" buffer, and if so, re-allocate at least a portion of said first quantity of memory to said second port from said first port for additional use as at least one buffer associated with said second port.

20. The computer system as recited in claim 14, wherein said computer system is resident on a printing apparatus.

21. The printing apparatus as recited in claim 20, wherein said processing circuit is further configured to: (a) activate a first port of said plurality of communications ports and allocate a first quantity of memory from said pool area for use as at least one buffer associated with said first port; (b) activate a second port of said plurality of communications ports and allocate a second quantity of memory from said pool area for use as at least one buffer associated with said second port, wherein said second quantity of memory is less than a desired nominal amount for use with said second port; and (c) inspect the status of said first quantity of memory and, if said first port is no longer active, re-allocate at least a portion of said first quantity of memory to said second port from said first port for additional use as at least one buffer associated with said second port.

22. The printing apparatus as recited in claim 20, wherein said processing circuit is further configured to: (a) activate a first port of said plurality of communications ports and allocate a first quantity of memory from said pool area for use as at least one buffer associated with said first port; (b) activate a second port of said plurality of communications ports and allocate a second quantity of memory from said pool area for use as at least one buffer associated with said second port, wherein said second quantity of memory is less than a desired nominal amount for use with said second port; and (c) inspect the status of said first quantity of memory and, if said first port is still active, determine whether a first print job received at said first port has a higher or lower priority level than a second print job received at said second port, and if the priority level of said second print job is greater than the priority level of said first print job, further inspect said at least one buffer associated with said first port to determine if there is any "free" buffer, and if so, re-allocate at least a portion of said first quantity of memory to said second port from said first port for additional use as at least one buffer associated with said second port.

\* \* \* \* \*